United States Patent [19]

Fujii et al.

[11] Patent Number: 4,667,315
[45] Date of Patent: May 19, 1987

[54] TIGHT BEAM POSITION CONTROLLING APPARATUS

[75] Inventors: Yoshikazu Fujii; Tetsuya Inui; Toshihisa Deguchi; Tohru Okuda, all of Nara, Japan

[73] Assignee: Sharp Kabushiki Kaisha, Osaka, Japan

[21] Appl. No.: 652,604

[22] Filed: Sep. 20, 1984

[30] Foreign Application Priority Data

Nov. 9, 1983 [JP] Japan ............................ 58-211459
Jan. 10, 1984 [JP] Japan ............................... 59-3794
Jan. 10, 1984 [JP] Japan ............................... 59-3795
May 9, 1984 [JP] Japan .............................. 59-93584
May 25, 1984 [JP] Japan ............................. 59-106780

[51] Int. Cl.$^4$ .......................................... G11B 7/095
[52] U.S. Cl. ................................................. 369/44
[58] Field of Search ................. 369/44, 45, 46, 111; 358/342

[56] References Cited

U.S. PATENT DOCUMENTS

| 4,005,260 | 1/1977 | Janssen ..................... 369/44 |
| 4,286,318 | 8/1981 | Immink et al. ............ 369/44 |
| 4,446,545 | 5/1984 | Van Dijk ................... 369/44 |
| 4,488,276 | 12/1984 | Tanaka et al. ............ 369/46 |

*Primary Examiner*—Donald McElheny, Jr.
*Attorney, Agent, or Firm*—Birch, Stewart, Kolasch & Birch

[57] ABSTRACT

A light beam position controlling apparatus includes a linear motor for driving an optical head in the radial direction of an optical disk, a radial actuator built-in within said optical head and adapted to drive an objective lens for causing the light beam to be accurately positioned in the radial direction of the optical disk and to rotate a mirror for causing the light beam to be deflected in the radial direction of the optical disk, which can be improved in the compression factor of the servo performance, by providing a phase lag compensation circuit and a damping correction circuit for increasing the gain of the transfer function at the resonance frequency of both the linear motor and radial actuator.

10 Claims, 51 Drawing Figures

CONVENTIONAL ART

TIGHT BEAM POSITION CONTROLLING APPARATUS

BACKGROUND OF THE INVENTION

1. Field of the Invention

The present invention relates to a light beam position controlling apparatus for an optical disk apparatus and an optical magnetic disk apparatus, which is adapted to optically record, reproduce, and erase information through application of light beams such as laser lights, etc. on a record medium.

2. Description of the Prior Art

Conventionally, in optical disk apparatus or optical magnetic disk apparatus, the record medium's face is displaced in the vertical direction, i.e., optical direction due to the movement of the disk face. The light beam spot is controlled in the disk vertical direction for adjustment so that the beam spot of the light beams might follow the displacement of the disk and be always focused on the medium face. Also, during the disk rotation, the information track portion on the disk is displaced in the lateral direction, namely, in the disk radius direction because of the eccentricity between the center of the tracks on the disk and the rotational center of the motor rotating the disk. Thus, the light beam position is controlled in the disk radial direction for adjustment so that the beam spot of the light beam may be always positioned on the information track by moving the beam spot of the light beam to follow the displacement of the information track on the disk. Also, position controlling, i.e., access controlling is performed on the beam spot at a high speed and with high accuracy to get the selectable track of the entire disk radius zone.

Generally, among the well known mechanisms for beam spot control, there is a mechanism in which the objective lens supported by two parallel-plate springs is driven vertically and laterally by an electromagnetic force; a mechanism which rotates the mirror by electromagnetic force to tilt the incident light axis of the objective lens thereby to laterally displace the beam spot position or a mechanism which drives an optical head, supported by a slide bearing, in the lateral direction by electromagnetic force.

The focus controlling operation is effected by a feedback controlling operation of sensing the relative displacement, i.e. focus error between the beam spot and disk medium surface by the method of passing the focus error signal through a phase lead compensating circuit, and thereafter feeding it into the focus actuator driving circuit to drive the focus actuator. Also, the radial controlling operation is performed by a feedback controlling operation of sensing the relative displacement, i.e., radial error between the information track on the optical disk and the beam spot by the method of passing the radial error signal through the phase lead compensating circuit, and thereafter feeding it into the radial actuator driving circuit to drive the radial actuator. The phase lead compensating circuit is a circuit for improving the stability of the feedback controlling system.

However, various problems exit in the mechanical apparatus. In the feedback controlling system composed of the above-described actuator and phase lead compensating circuit, a phase lag compensating circuit having break point frequencies between a disk rotation frequency, wherein the frequency component of displacement is largest, and the actuator resonance frequency is built-in in the feedback controlling system to improve the compression factor near the disk rotation frequency. However, as the damping factor of the actuator is small (that is, in general, the damping factor $\zeta < 0.5$), the phase lag $\theta$ in the feedback controlling system with the phase lag compensating circuit built-in therein becomes smaller than ($-180°$) near the actuator resonance frequency. Thus, the operation is so unstable that the above-described phase lag compensating circuit cannot be built-in to the feedback controlling system, or if it has been built-in, the results have to be controlled by making the gain extremely small. As a result, the compression factor of the feedback controlling system becomes lower, so that the desired servo performance cannot be provided.

Also, in a mechanism wherein the objective lens is supported with the above-described two parallel springs or a mechanism for rotating the mirror, the entire controlling mechanism becomes too large as compared with the optical head for moving the beam spot across the entire disk radius zone. Also, in the mechanism wherein the optical head is supported by a slide bearing, the holding force of the moving-part with respect to the radial direction is weak and the mechanism is weak against the disturbance oscillation applied upon the optical disk apparatus. Also, in the mechanism supported by the slide bearing, the beam spot position controlling operation with a precision on the order of sub micron or less cannot be performed due to influences by the stick slip or the like of the slide bearing portion.

A method of performing parallel controlling operation by both mechanisms is considered from these disadvantages to compensate for the respective disadvantages of a mechanism for supporting the objective lens with two parallel springs or a mechanism (hereinafter referred to as radial actuator mechanism) for tilting the incident optical axis of the objective lens through rotation of the mirror with the use of electromagnetic force to laterally displace the beam spot and a mechanism (hereinafter referred to as linear mechanism) for driving the optical head, supported by a slide bearing, with the use of the electromagnetic force. But both mechanisms are mutually negatively influenced with respect to the disturbance oscillation applied upon the optical disk apparatus in the simple driving operation of both the mechanisms, thus resulting in the oscillation increasing towards the unstable condition. As the driving force of the linear motor is not applied directly upon the objective lens supported by the radial actuator mechanism, phase lag is caused in the displacement of the objective lens from the displacement of the optical head, so that the stable parallel controlling operation cannot be performed.

Also, at the switching from the access control to the radial control or from the jump control to the radial control, the setting condition of the light beam position immediately after the servo loop of the feed-back controlling system has been closed was extremely unstable, because the position of the information track always moves and the initial value of the radial error is thus greatly changed. To improve the stability, there is a method of storing the radial driving current synchronously with the disk rotation in the closed loop condition of the feedback controlling system, adding a memory signal to the radial actuator during the closed loop and the open loop of the radial control system to reduce the relative displacement, i.e., radial error between the information track on the disk and the beam spot position thereby to reduce the instability of the radial control setting condition.

However, the radial driving current also had a noise component, a component caused by the shape of the individual information track, and a high-frequency component for making the closed loop servo condition stable, except for the frequency component resultant from the eccentric condition of the information track. Thus, if the radial driving current is stored as it is, and is fed to the radial actuator, the radial setting condition does not become stable as expected, thus resulting in instability due to the above-described components.

SUMMARY OF THE INVENTION

The present invention is provided to overcome the above-described disadvantages inherent in the conventional apparatus. An object of the present invention is to provide a light beam position controlling apparatus, with light beam position controlling which performs focus controlling and radial controlling for optical disk apparatus and magneto-optic disk apparatus, wherein a controlling apparatus improved in servo loop compression factor and stability is provided, which is capable of access to the selectable tracks of the entire disk, of an accuracy in follow-up control to the track of sub micron or less, and has a high tolerance against disturbance with respect to the optical disk.

Another object of the present invention is to provide a light beam position controlling apparatus wherein the compression factor is higher, the stability is better, the supression is higher against disturbance oscillation, stable parallel controlling operation is performed between the radial actuator and the linear motor, whereby the radial setting condition can be made stable.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Embodiments of a light beam position controlling apparatus in accordance with the present invention will be described in detail with reference to the drawings.

Figure 1:
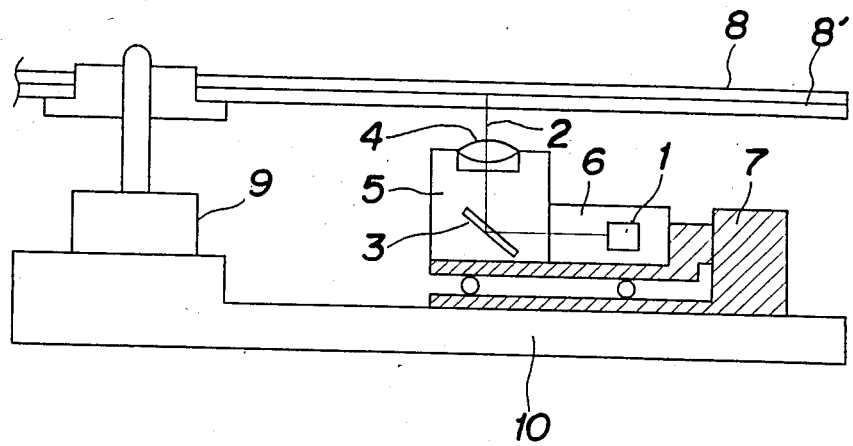
FIG. 1 is an exemplary front view showing a construction for illustrating an optical disk apparatus or a magneto-optic disk apparatus.

FIG. 1 is a construction illustrating view showing the construction of an optical disk unit or a magneto-optic disk unit. In FIG. 1, reference numeral 1 is a laser light source for emitting laser beams 2; reference numeral 3 is a mirror; reference numeral 4 is an objective lens for focussing the laser beams 2 on the disk record medium face; reference numeral 5 is an actuator for effecting a focus controlling operation and a radial controlling operation, which drive the objective lens 4 vertically and laterally to follow and control the light spot position on the record track of the disk record medium; reference numeral 6 is an optical head for accommodating the above-described optical systems, an optical system for reproducing the recorded information (not shown), a servo-optical system, and so on; reference numeral 7 is a linear motor which is adapted to laterally drive the optical head to perform the radial controlling operation or the recorded access controlling operation into the track position of the object; reference numeral 8 is an optical disk or a magneto-optic disk with a recording medium 8' being provided therein; reference numeral 9 is a motor for rotating and driving the disk; and reference numeral 10 is a support base for the above-described apparatus.

The controlling system of the beam spot position controlling apparatus in accordance with the present invention will be described hereinafter as compared with the conventional controlling system.

A. In the focus controlling or the radial controlling, a damping correction circuit is built-in to a feedback controlling system to increase the servo compression factor to ensure a stable controlling operation.

a. Conventional Controlling System

Figure 2:
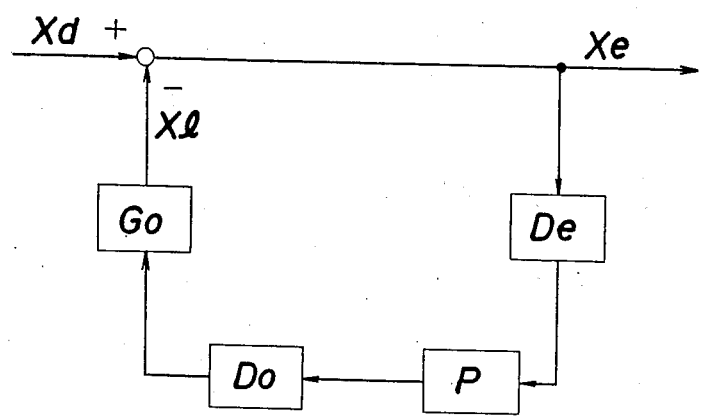
FIG. 2 is a block diagram of the conventional controlling system.

FIG. 2 is a block diagram of the conventional controlling system. In FIG. 2, reference Xd is the disk displacement; reference Xl is the objective lens displacement, Xe is the follow-up error; reference De is a detector which converts the follow-up error Xe into an electric signal; reference P is a phase-lead compensating circuit for performing the stable control; reference $G_O$ is an actuator for driving and displacing the objective lens; a reference $D_O$ is a driver for driving the $G_O$.

The respective transfer functions are represented by the following equations.

$$De = 1$$

$$P = \frac{S/\omega_3 + 1}{S/\omega_4 + 1}$$

$$D_0 = A \text{ (constant)}$$

$$G_0 = \frac{\omega_0^2}{S^2 + 2\zeta_0 \omega_0 S + \omega_0^2}$$

wherein
$\omega_0$: resonance frequency of $G_0$ ($\omega_0$ is larger than $\omega_r$; $\omega_r$ is disk rotation frequency)
$\zeta_0$: damping factor of $G_0$
$S$: $j\omega$
$\omega_3 \cdot \omega_4$: two break point frequencies ($\omega_3 < \omega_4$) of P An open loop transfer function G to be transmitted from the follow-up error Xe to the lens displacement Xl is as follows.

$$G = \frac{Xl}{Xe} = De \cdot P \cdot D_0 \cdot G_0$$

$$= A \cdot \frac{S/\omega_3 + 1}{S/\omega_4 + 1} \cdot \frac{\omega_0^2}{S^2 + 2\zeta_0 \omega_0 S + \omega_0^2}$$

In the closed loop controlling system of FIG. 2, $$\begin{cases} Xl = G \cdot Xe \\ Xe = Xd - Xl \end{cases}$$

Therefore, $$Xe = \frac{1}{1 + G} \cdot Xd$$

Assume that the compression factor in the closed loop transfer function with respect to the disk displacement Xd of the follow-up error Xe is H, and $$H = \frac{Xe}{Xd} = \left| \frac{1}{1 + G} \right|$$

Then, assume that a frequency (hereinafter referred to as cut-off frequency) wherein the compression factor H becomes 1 is $\omega_c$, and $$|H| = \left| \frac{1}{1 + G} \right|$$

$$= \frac{1}{\left| 1 + A \cdot \frac{S/\omega_3 + 1}{S/\omega_4 + 1} \cdot \frac{\omega_0}{S^2 + 2\zeta_0 \omega_0 S + \omega_0^2} \right|}$$

wherein $S = j\omega$; In $\omega = \omega_c$, $\omega_0 << \omega_c$ and $1 << A$. The $\omega_3 \cdot \omega_4$ is so determined that $\omega_3 < \omega_4$ may be established, and $$1 = |H| \approx \cfrac{1}{\left| A \cdot \cfrac{\omega_c}{\omega_3} \cdot \cfrac{\omega_0^2}{\omega_c^2} \right|}$$

Therefore, $$A = \frac{\omega_3 \cdot \omega_c}{\omega_0^2}$$

Figure 3:
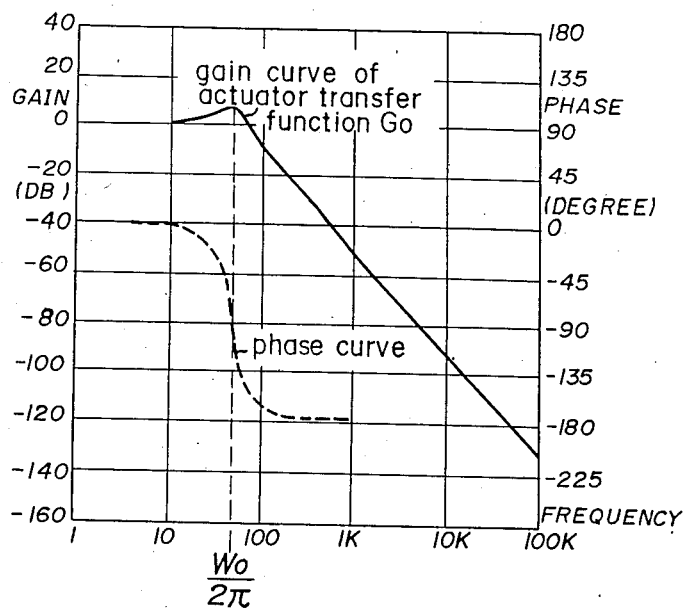
FIG. 3 is a board diagram of an actuator transfer function $G_O$.
Figure 4:
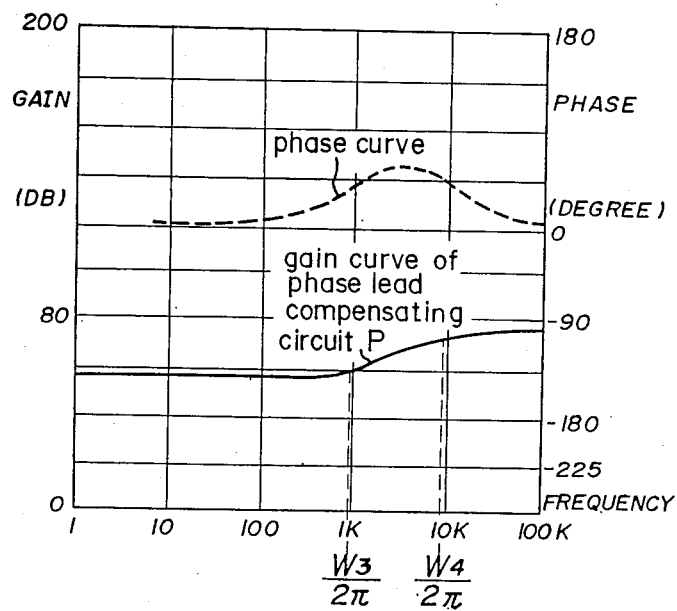
FIG. 4 is a board diagram of a phase lead compensating circuit P.
Figure 5:
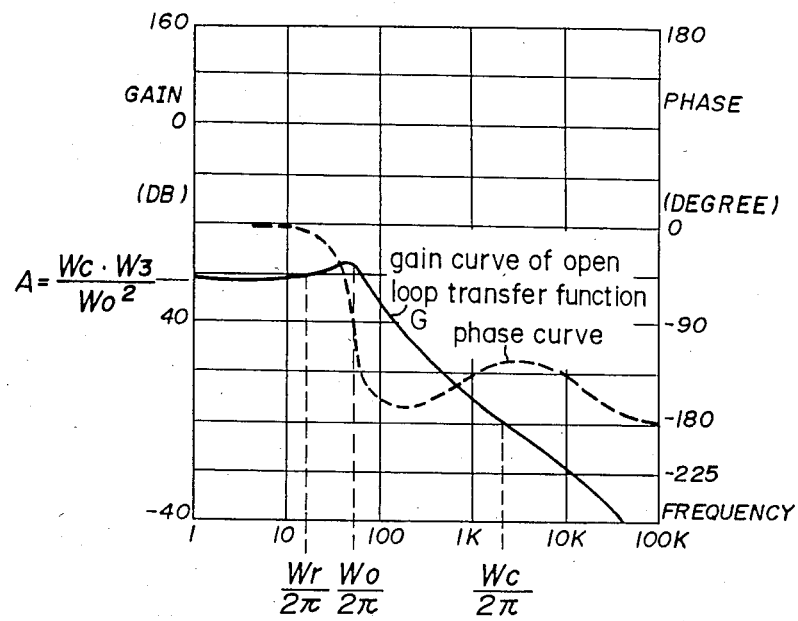
FIG. 5 is a board diagram of the open loop transfer function G of FIG. 2.
Figure 6:
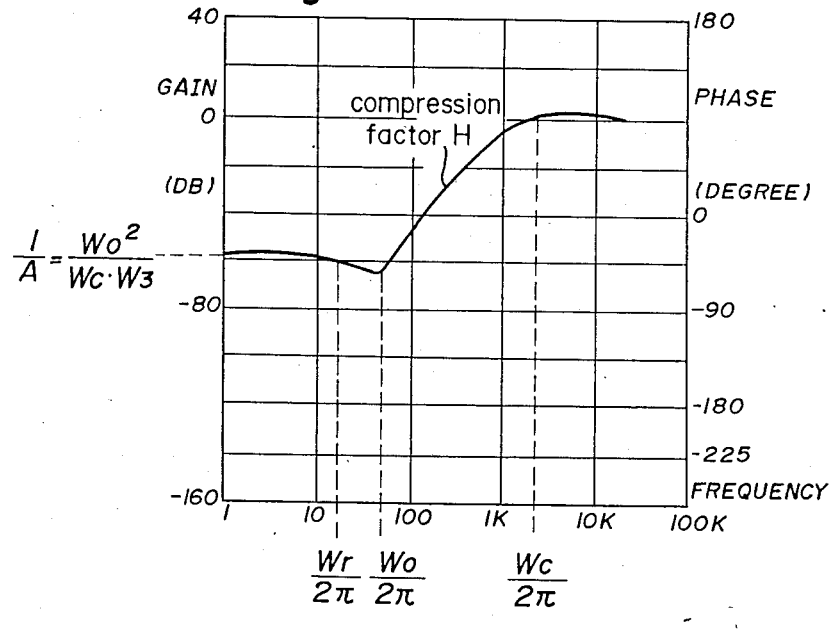
FIG. 6 is a chart of the compression factor H vs. frequency of FIG. 2.

FIG. 3 is a board diagram of the transfer function $G_O$ of the actuator; FIG. 4 is a board diagram of a phase lead compensating circuit P; FIG. 5 is a board diagram of an open loop transfer function G; FIG. 6 is a board diagram of the compression factor H; wherein the solid line is a gain curve and the dotted line is a phase curve.

As shown from FIG. 5 and FIG. 6, the compression $H_r$ near the disk rotation frequency $\omega_r$ ($\omega_r = 2\pi f_r$) is as follows.

$$|H_r| = \frac{1}{A} = \frac{\omega_0^2}{\omega_3 \cdot \omega_c}$$

Then, for instance, one case will be described, wherein in order to improve the compression factor $H_r$ near the disc rotation frequency $\omega_r$, a phase lag compensating circuit having break point frequencies between the disk rotation frequency and the actuator resonance frequency is built-into the feedback controlling system.

Figure 7:
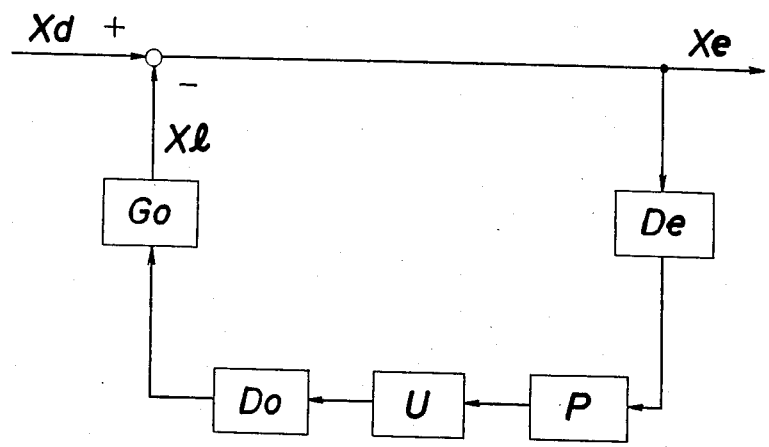
FIG. 7 is a block diagram of a controlling system with a phase lag compensating circuit U being built-in therein.

FIG. 7 is a block diagram of a feedback controlling system with a phase lag compensating circuit U being built-in thereto.

The transfer function of the phase lag compensating circuit U is $$U = \frac{s + \omega_2}{s + \omega_1}$$

wherein $\omega_1$, $\omega_2$ are two break-point frequencies ($\omega_1 < \omega_2$) of U.

Thus, the open loop transfer function $G'$ is as follows.

$$G' = D_e \cdot P \cdot U \cdot D_0 \cdot G_0$$

$$= A \cdot \frac{S + \omega_2}{S + \omega_1} \cdot \frac{S/\omega_3 + 1}{S/\omega_4 + 1} \cdot \frac{\omega_0^2}{S^2 + 2\zeta_0\omega_0 S + \omega_0^2}$$

When the $\omega_1 < \omega_r$ has been established, the compression factor $H_r'$ in the disk rotation frequency $\omega_r$ is $$|H_r'| = \frac{1}{A \cdot \frac{\omega_2}{\omega_r}} = \frac{\omega_r}{\omega_2} \cdot \frac{\omega_0^2}{\omega_3 \cdot \omega_c}$$

The compression factor is improved by the rate of the $\omega_r/\omega_2$ compared with $H_r$.

Figure 8:
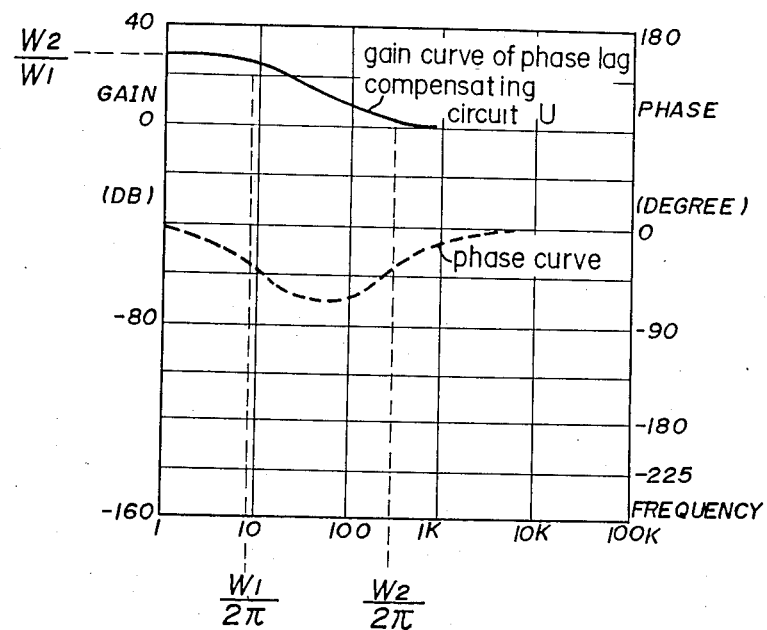
FIG. 8 is a board diagram of the phase lag compensating circuit U.
Figure 9:
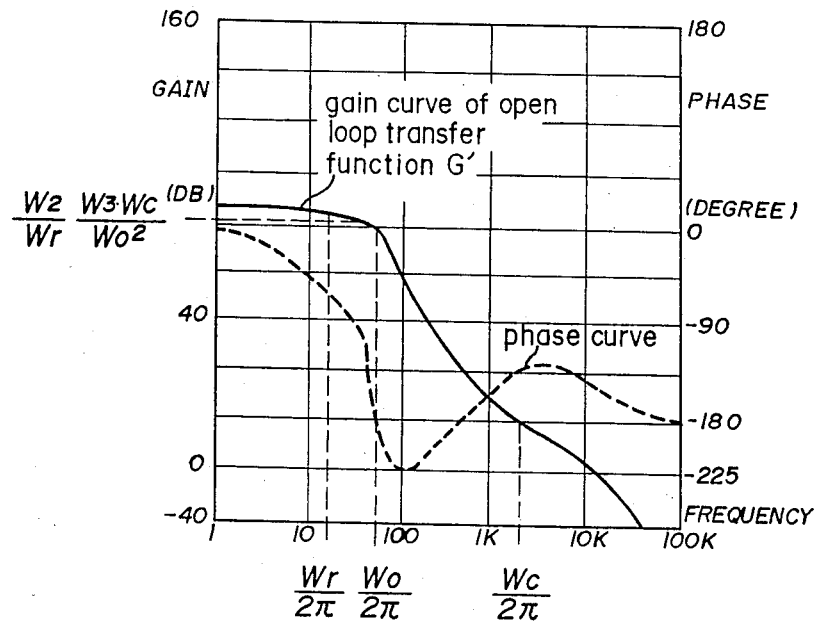
FIG. 9 is a board diagram of the open loop transfer function G' of FIG. 7.

FIG. 8 is a board diagram of the phase lag compensating circuit U; FIG. 9 is a board diagram of the open loop transfer function $G'$ with the U being built-in thereto.

However, in the above-described case, the phase of the open loop transfer function $G'$ becomes $\theta'G < -180°$ near the actuator resonance frequency $\omega_0$ ($\omega_0 = 2\pi f_0$) from FIG. 9 so that it cannot be stably controlled. Also, if $\omega_1$, $\omega_2$ of the phase lag compensating circuit U are set so that $\theta'G > -180°$ becomes established, the compression cannot be expected to be improved, because $\omega_2/\omega_1$ becomes close to 1.

b. Controlling System of the Present Invention

A controlling unit of the beam spot position controlling apparatus of the present invention will be described hereinafter.

Figure 10:
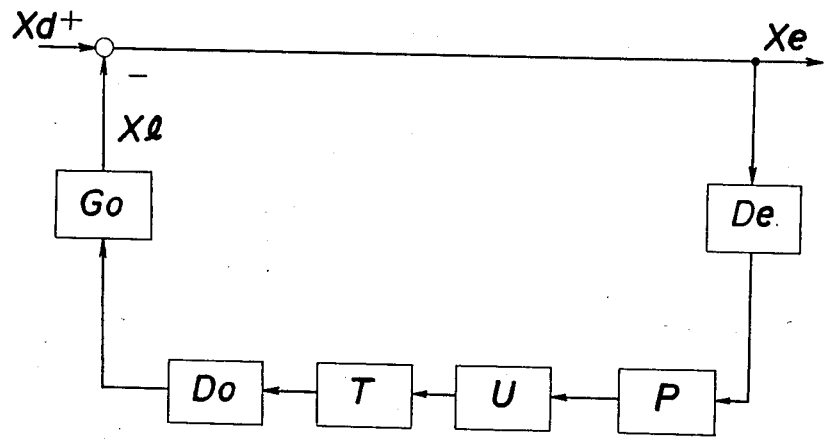
FIG. 10 is a block diagram of the controlling system in accordance with the present invention.

FIG. 10 is a block diagram of the controlling system in accordance with the present invention, wherein the phase lag compensating circuit U and a damping compensation circuit T are built-in to the feedback controlling system. The damping compensation circuit T stabilizes the feedback controlling system through the advancement of the frequency above the resonance frequency $\omega_0$ and its vicinity, and the transfer function T is $$T = \frac{s^2 + 2\zeta_0 \omega_0 s + \omega_0^2}{s^2 + 2\zeta_1 \omega_0 s + \omega_0^2}$$

wherein $1 \leq \zeta_1$,

Thus, the open loop transfer function $G''$ is $$G'' = D_e \cdot P \cdot U \cdot T \cdot D_0 \cdot G_0$$

$$= A \cdot \frac{S + \omega_2}{S + \omega_1} \cdot \frac{S/\omega_3 + 1}{S/\omega_4 + 1} \cdot \frac{\omega_0^2}{S^2 2\zeta_1\omega_0 S + \omega_0^2}$$

The phase lag compensating circuit is constructed so that U becomes $\omega_1 \cdot \omega_2 = \omega_0^2$ and to construct so that the damping correction circuit T becomes $$\zeta_1 = \frac{\omega_1 + \omega_2}{2\omega_0} \text{ and}$$

$$G'' = A \cdot \frac{S + \omega_2}{S + \omega_1} \cdot \frac{S/\omega_3 + 1}{S/\omega_4 + 1} \cdot \frac{\omega_0^2}{S^2 + (\omega_1 + \omega_2)S + \omega_1 \cdot \omega_2}$$

$$= A \cdot \frac{S/\omega_3 + 1}{S/\omega_4 + 1} \cdot \frac{\omega_0^2}{(S + \omega_1)^2}$$

In the case of the $\omega_1 < \omega_r$, the compression factor $H_r''$ in the disk rotation frequency $\omega_r$ is $$|H_r''| = \frac{1}{A \cdot \frac{\omega_r^2}{\omega_0^2}} = \frac{\omega_r^2}{\omega_3 \cdot \omega_c}$$

The compression factor $H_r''$ is further improved by the ratio of the $\omega_r^2/\omega_0^2$ as compared with the $H_r$.

Figure 11:
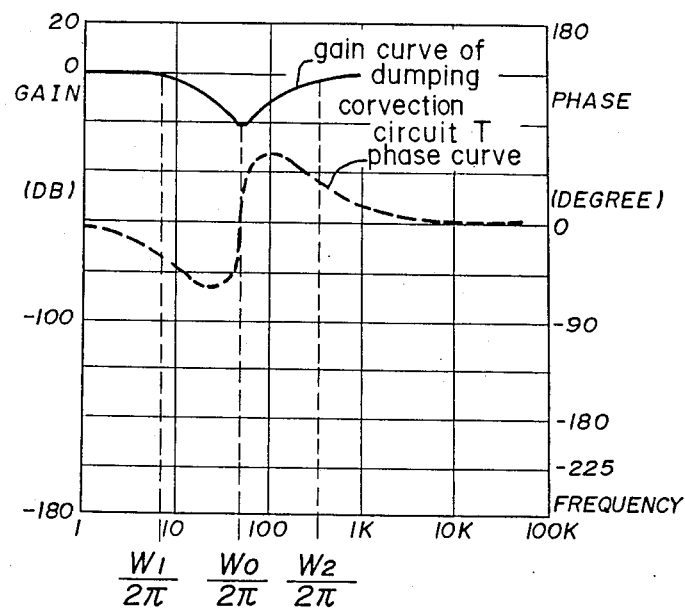
FIG. 11 is a board diagram of a damping characteristic correction circuit T of FIG. 10.
Figure 12:
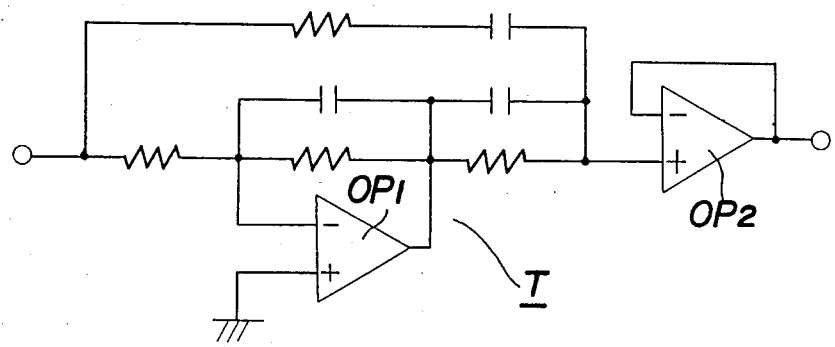
FIG. 12 is a block diagram showing one example in a case where the damping correction circuit T is composed of operational amplifiers.
Figure 13:
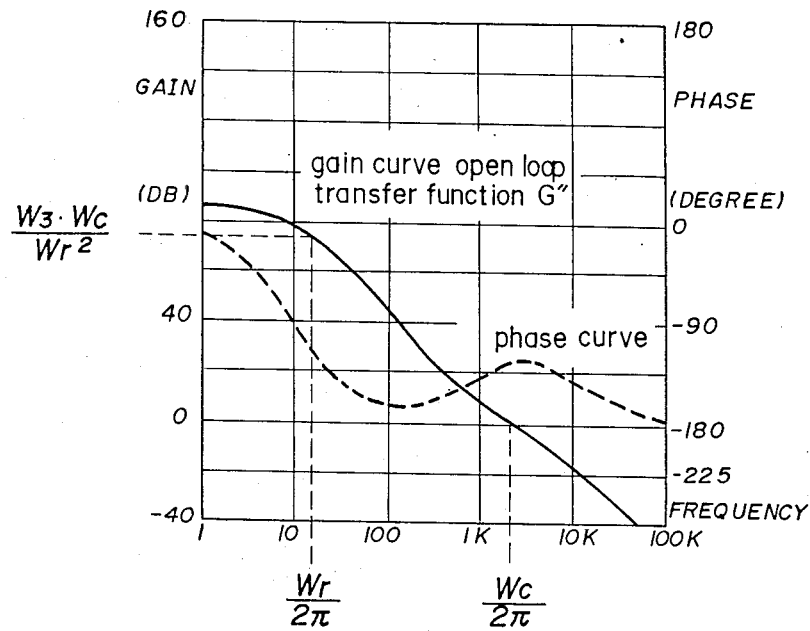
FIG. 13 is a board diagram of the open loop transfer function G" of FIG. 10.
Figure 14:
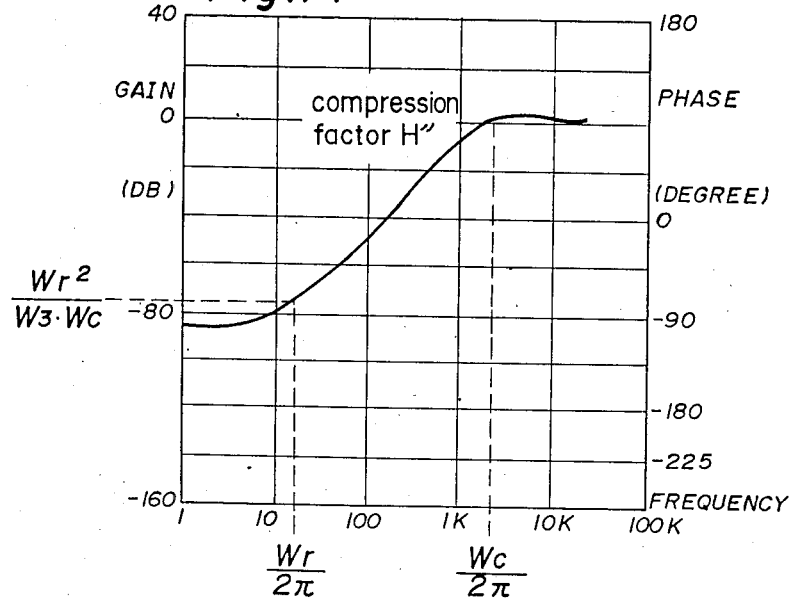
FIG. 14 is a frequency characteristic chart of the compression factor H" of FIG. 10.

FIG. 11 is a board diagram of the damping correction circuit T; FIG. 12 is one example wherein the damping correction circuit T is composed of operational amplifiers $OP_1$, $OP_2$; FIG. 13 is a board diagram of the open loop transfer function $G''$ with the phase lag compensating circuit U and the damping correction circuit T being built-in thereto; FIG. 14 shows the frequency characteristics of the compression factor $H''$.

As apparent from FIG. 14, the phase $\theta$ is rendered to $\theta > -180°$ in the frequency of $\omega_c$ or less, thus resulting in sufficiently stable controlling system.

In the above description, the constants $\omega_1$, $\omega_2$ of the phase lag compensating circuit U are $\omega_1 \cdot \omega_2 = \omega_0^2$.

The constant $\zeta_1$ of the damping correction circuit T is constructed to become the following equation.

$$\zeta_1 = \frac{\omega_1 + \omega_2}{2\omega_0}.$$

It is effective if such $\omega_1$, $\omega_2$, $\zeta_1$ are provided as the phase $\theta$ of the open loop transfer function $G''$ becomes $\theta > -180°$ in the frequency of $\omega_c$ or lower even if the respective equations are not necessarily satisfied. However if $$\omega_1 \cdot \omega_2 = \omega_0^2, \zeta_1 = \frac{\omega_1 + \omega_2}{2\omega_0},$$

the phase condition of the open loop transfer function $G''$ becomes most stable, thus resulting in better effect.

Also, the characteristics of the actuator are at random, and the resonance frequency $\omega_0$ is dispersed near the $\omega_0$ without having a constant value. If the resonance frequencies of the phase lag compensating circuit U and the damping compensating circuit T are out of phase higher than the resonance frequency of the actuator, the phase $\theta$ of the open loop transfer function $G''$ is shifted onto the lag side in the frequency above the $\omega_0$ near the $\omega_0$ and becomes $\theta < -180°$. Also, if the phase is shifted low, it is shifted on the lead side and becomes $\theta > -180°$, thus resulting in stability. When the phase lag compensating circuit U and the damping correcting circuit T are designed, it was found better to be set somewhat lower than $\omega_0$ in anticipation of the dispersion of the resonance frequency $\omega_0$ of the actuator.

B. The resonance frequency of the linear motor is increased more than the disk rotation frequency to perform the phase lag compensation thereby to improve the stiffness of the low frequency.

a. Conventional Controlling System

Figure 15:
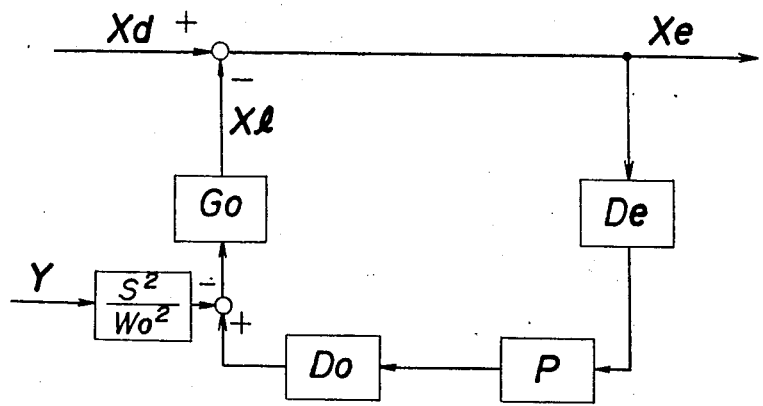
FIG. 15 is a block diagram of the conventional radial controlling system.

FIG. 15 is a block diagram of the conventional radial controlling system. In FIG. 15, reference Xd is disk displacement, reference Xl is object lens displacement, reference Xe is follow-up error, reference Y is disturbance oscillation, reference De is a detector for converting the radial follow-up error Xe into electrical signals, reference P is a phase lead compensating circuit for stably performing the radial controlling operation, reference $G_0$ is a radial actuator or a linear motor for driving and displacing the objective lens in the radial direction, and reference $D_0$ is a driver for driving the $G_O$. The respective transfer function is expressed in the following equation.

$$De = 1$$

$$P = \frac{\frac{S}{\omega_3} + 1}{\frac{S}{\omega_4} + 1}$$

$$D_0 = A \text{ (constant)}$$

$$G_0 = \frac{\omega_0^2}{S^2 + 2\zeta_0\omega_0 S + \omega_0^2}$$

wherein $\omega_0$ is resonance frequency of $G_O$,
$\zeta_0$ is the damping factor of $G_O$,
S is $j\omega$, and $\omega_3$, $\omega_4$ are two folded point frequencies ($\omega_3 < \omega_4$).

Also, the disturbance transfer function $G_Y$ to be transmitted to the lens displacement Xl from the disturbance oscillation Y is $$G_Y = \frac{Xl}{Y} = -\frac{S^2}{\omega_0^2} G_0 = -\frac{S^2}{S^2 + 2\zeta_0\omega_0 S + \omega_0^2}$$

The open loop transfer function G to be transmitted to the lens displacement Xl from the radial follow-up error Xe is $$G = \frac{Xl}{Xe} = De \cdot P \cdot D_0 \cdot G_0 =$$

$$A \cdot \frac{S/\omega_3 + 1}{S/\omega_4 + 1} \cdot \frac{\omega_0^2}{S^2 + 2\zeta_0\omega_0 S + \omega_0^2}$$

In the closed loop controlling system of FIG. 15, $$Xl = G \cdot Xe - \frac{S^2}{\omega_0^2} G_0 \cdot Y$$

$$Xe = Xd = Xl$$

Thus, $$Xe = \frac{1}{1 + G} \cdot Xd + \frac{G_Y}{1 + G} \cdot Y$$

Assume that the compression factor in the open loop transfer function with respect to the disk displacement Xd of the radial follow-up error Xe is H, $$H = \frac{Xe}{Xd} = \left| \frac{1}{1 + G} \right|$$

The disturbance compression factor $H_Y$ with respect to the turbulance oscillation Y of the radial follow-up error Xe is $$H_Y = \frac{Xe}{Y} = \left| \frac{G_Y}{1 + G} \right| = |H \cdot G_Y|$$

The acceleration $a_Y$ to be caused by the disturbance oscillation Y is $$a_Y = S^2 \cdot Y$$

Also, the disturbance acceleration for displacing Xe by unit distance, i.e., the stiffness with respect to the disturbance is $$S = \frac{a_Y}{Xe} = \frac{S^2 \cdot Y}{Xe} = \left| \frac{S^2}{H_Y} \right|$$

Then, assume that a frequency (hereinafter referred to as cut-off frequency) wherein the compression factor H becomes 1 is $\omega_c$, and $$H = \left| \frac{1}{1+G} \right| = \frac{1}{\left| 1 + A \cdot \frac{S/\omega_3 + 1}{S/\omega_4 + 1} \cdot \frac{\omega_0^2}{S^2 + 2\zeta_0\omega_0 S + \omega_0^2} \right|}$$

wherein $S = j\omega$.

In the $\omega = \omega_c$, $\omega_0 \ll \omega_c$ and $1 \ll A$.

$$1 = |H| \approx \frac{1}{\left| A \cdot \frac{\omega_0^2}{\omega_c^2} \right|} = \frac{\omega_c^2}{A \cdot \omega_0^2}$$

Thus, $\omega_c \approx \sqrt{A} \cdot \omega_0$

Strictly, the $\omega_c$ is represented as $\sqrt{\omega_3 \cdot \omega_c}$, but the $\omega_c \approx \sqrt{A} \cdot \omega_0$ is used hereinafter, because it does not influence to the substance of the present invention.

In the closed loop controlling system of FIG. 15, the stiffness S with respect to the disturbance is almost constant in the cut-off frequency $\omega_c$ or lower by $$S = \left| \frac{S^2}{H_Y} \right| = \left| \frac{1+G}{G_Y} \cdot S^2 \right| =$$

$$\left| -\omega_0^2 \cdot \frac{1 + A \cdot G_0 \cdot \frac{S/\omega_3 + 1}{S/\omega_4 + 1}}{G_0} \right|$$

Then, $$S \approx |-A\omega_0^2| = \omega_c^2$$

For example, if the cut-off frequency is 1 KHz, $$\omega_c = 2\pi \cdot f_c = 2000\pi$$

$$\therefore S \approx (2000\pi)^3 \approx 3.95 \times 10^7 N/m \approx 4G/\mu m$$

Figure 16:
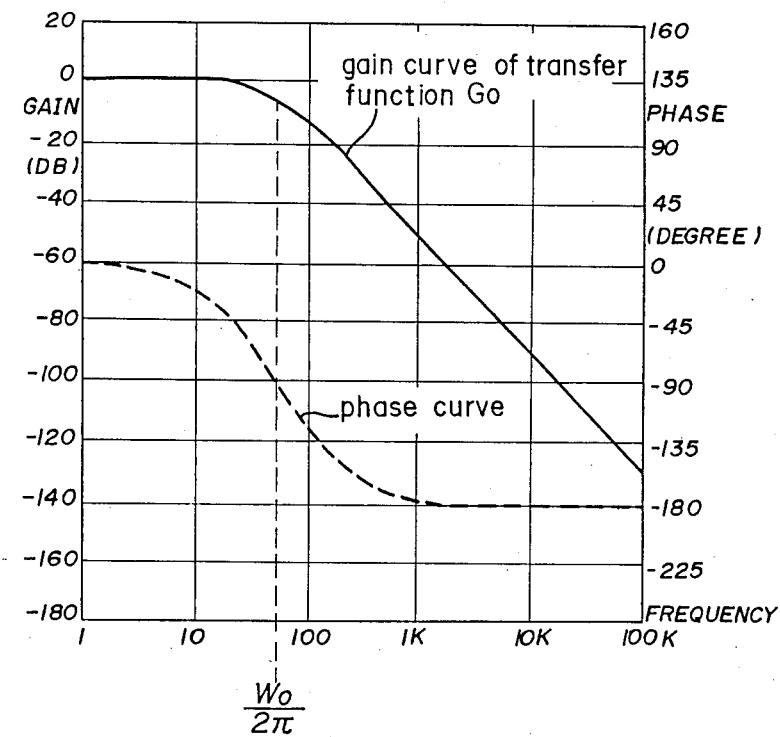
FIG. 16 is a board diagram of the linear motor transfer function $G_O$ or the radial actuator.
Figure 17:
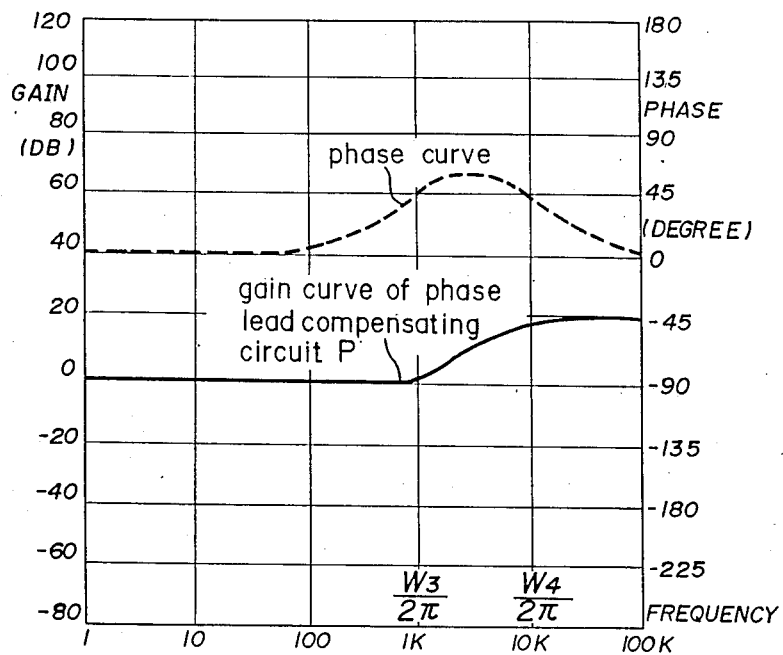
FIG. 17 is a board diagram of the phase lead compensating circuit P.
Figure 18:
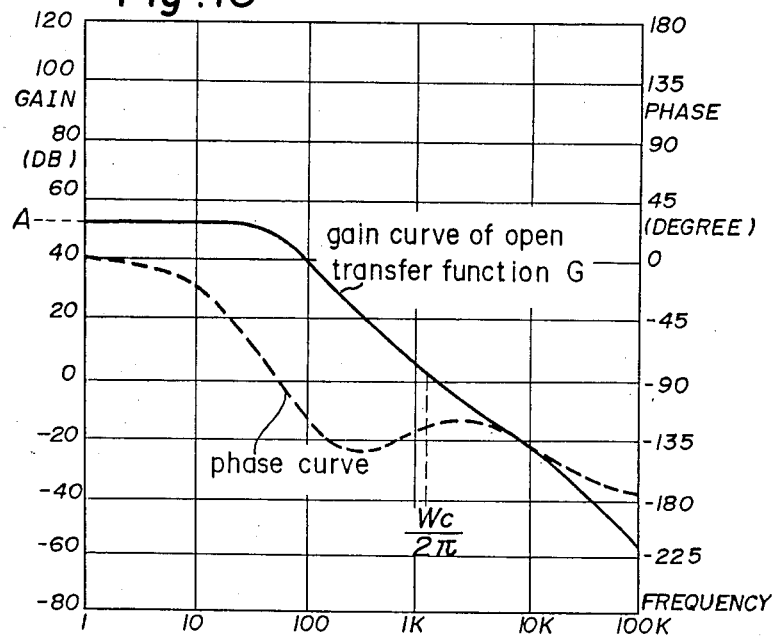
FIG. 18 is a board diagram of the open loop transfer function G of FIG. 15.
Figure 19:
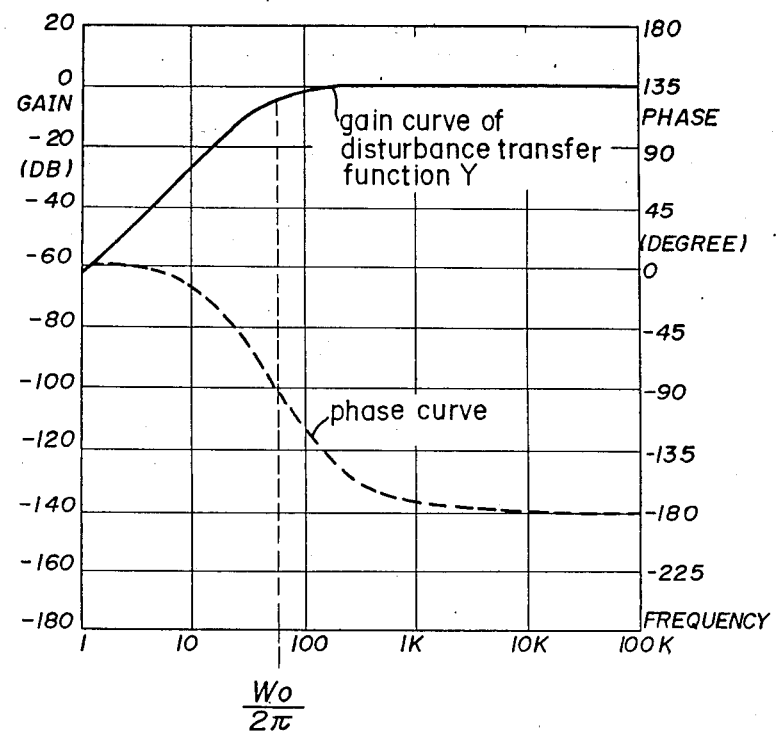
FIG. 19 is a board diagram of the disturbance transfer function $G_Y$.
Figure 20:
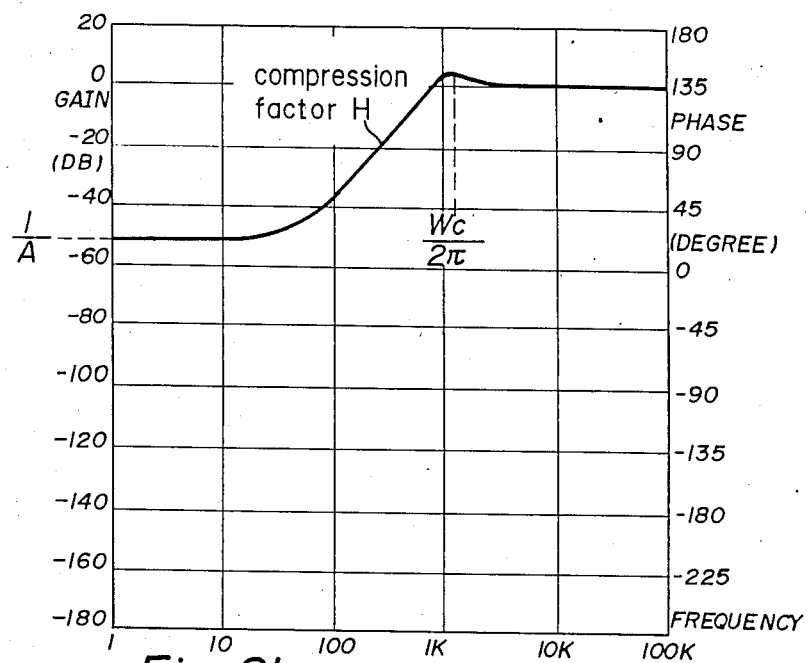
FIG. 20 is a frequency characteristic chart of the compression factor H.
Figure 21:
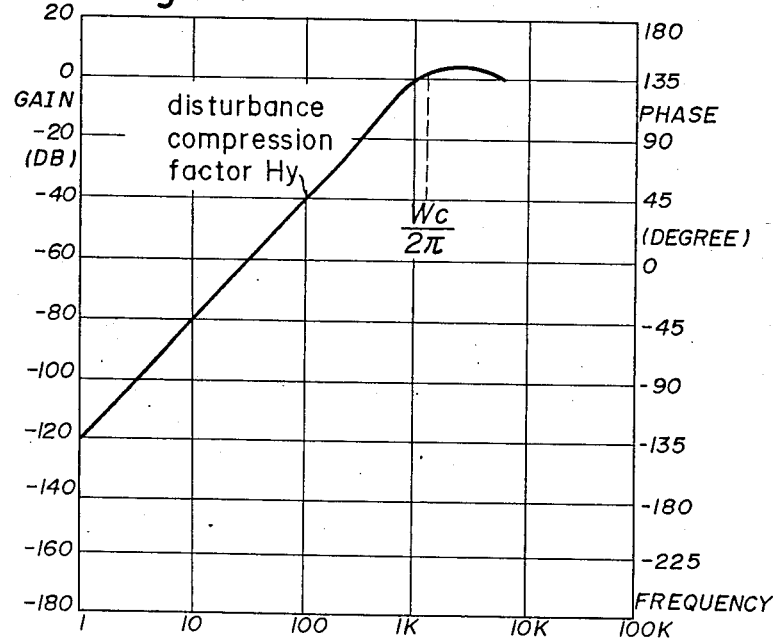
FIG. 21 is a frequency characteristic chart of the disturbance compression factor $H_Y$.
Figure 22:
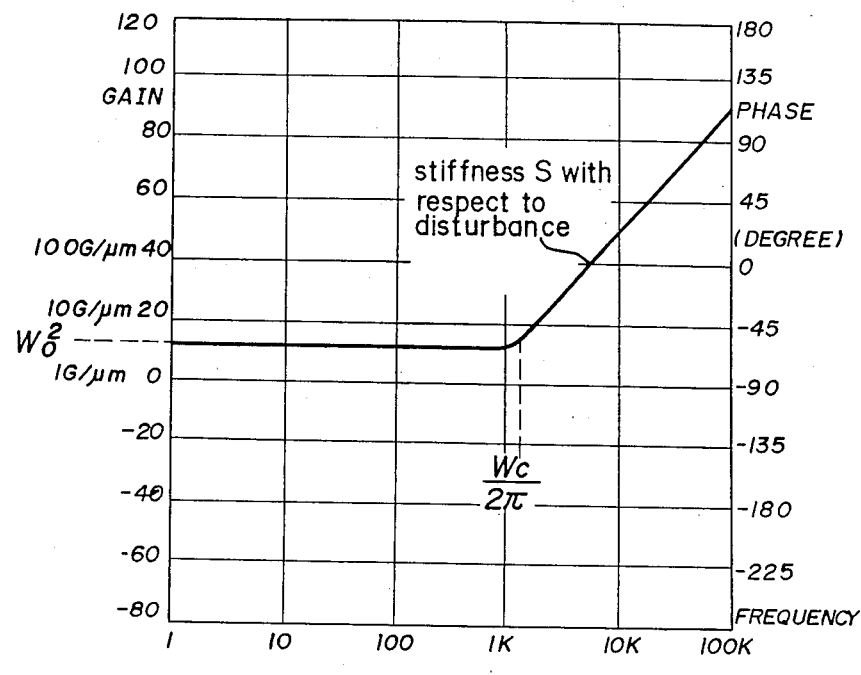
FIG. 22 is a frequency characteristic chart of the stiffness S with respect to the disturbance.

FIG. 16 is a board diagram of the transfer function $G_O$ of the radial actuator or the linear motor; FIG. 17 is a board diagram of a phase lead compensating circuit P; FIG. 18 is a board diagram of the open loop transfer function G; FIG. 19 is a board diagram of the turbulence transfer function $G_Y$; FIG. 20 is a frequency characteristic chart of the compression factor H; FIG. 21 is a frequency characteristic chart of the turbulence compression factor $H_Y$; FIG. 22 is a frequency characteristic chart of the stiffness S with respect to the turbulence, wherein the solid line is a gain curve and the dotted line is a phase curve.

b. Controlling System in the Present Invention

Figure 23:
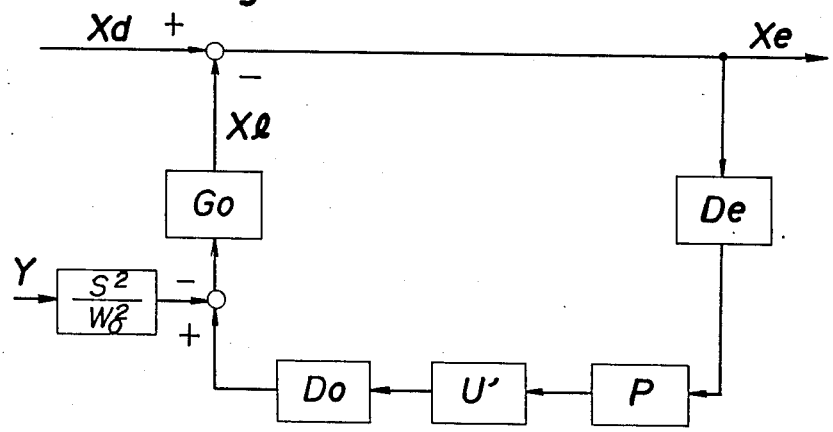
FIG. 23 is a block diagram of the radial controlling system in accordance with the present invention.

The radial controlling system of the light beam position controlling apparatus in accordance with the present invention will be described hereinafter. FIG. 23 is a block diagram of the radial controlling system. In FIG. 23, the same portions as those of FIG. 15 are represented by the same reference characters. Assume here that the resonance frequency $\omega_0$ of $G_O$ is the disk rotation frequency $\omega_r$ or more.

The transfer function of U' is $$U' = \left( \frac{S/\omega_0 + 1}{S/\omega_1 + 1} \right)^2$$

wherein $\omega_1$ is the low break-point frequency ($\omega_1 < \omega_0$) of the U.

Therefore, the open loop transfer function G' is $$G' = D_e \cdot P \cdot U' \cdot D_0 \cdot G_0$$

$$= A \cdot \frac{S/\omega_3 + 1}{S/\omega_4 + 1} \cdot \left( \frac{S/\omega_0 + 1}{S/\omega_1 + 1} \right)^2 \cdot \frac{\omega_0^2}{S^2 + 2\zeta_0\omega_0 S + \omega_0^2}$$

The stiffness S with respect to the turbulence is $$S = \left| \frac{S^2}{H_Y} \right| = \left| \frac{S^2}{H \cdot G_y} \right| = \left| \frac{(1+G) \cdot S^2}{G_y} \right|$$

$$= \left| -\omega_0^2 \cdot \frac{1 + A \cdot G_0 \cdot \frac{S/\omega_3 + 1}{S/\omega_4 + 1} \cdot \left( \frac{S/\omega_0 + 1}{S/\omega_1 + 1} \right)^2}{G_0} \right|$$

Accordingly, in the cut-off frequency $\omega_c$ or lower, the stiffness S becomes as shown in a table 1 given hereinafter. In the low frequency scope of the $\omega_1$ or lower, $$\left( \frac{\omega_0}{\omega_1} \cdot \omega_c \right)^2$$

is established, thus resulting in performance $$\left( \frac{\omega_0}{\omega_3} \right)^2$$

time as better as the conventional radial controlling system.

TABLE 1

| $\omega$ | ~ | $\omega_1$ | ~ | $\omega_0$ | ~ | $\omega_c$ |
|---|---|---|---|---|---|---|
| S | $\left( \frac{\omega_0}{\omega_1} \cdot \omega_c \right)^2$ | ~ | | ~ | | $\omega_c^2$ |

Also, as the $\omega_0$ is higher than the disk rotation frequency $\omega_r$, the stiffness with respect to the turbulance even in the disk rotation frequency $\omega_r$ is improved as compared with the conventional radial controlling system.

Figure 24:
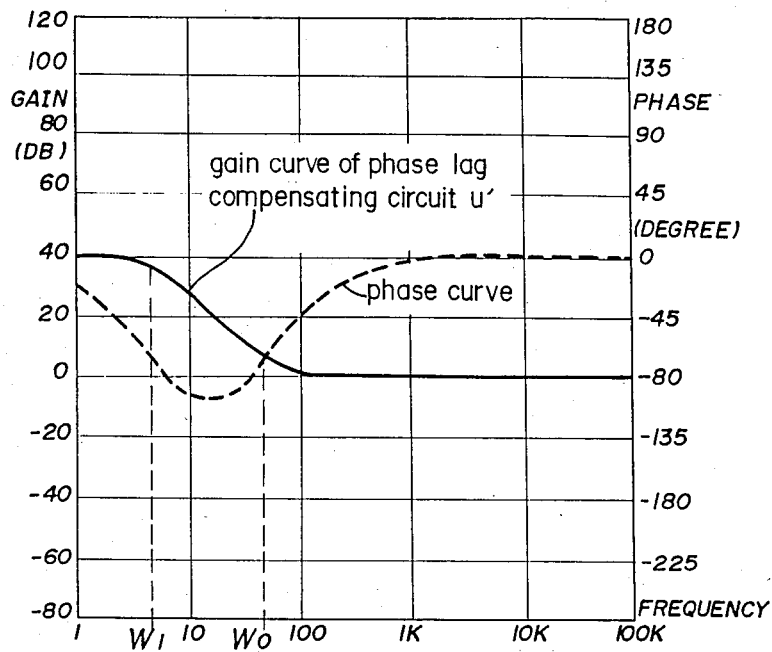
FIG. 24 is a board diagram of the phase lag compensating circuit U' of FIG. 23.
Figure 25:
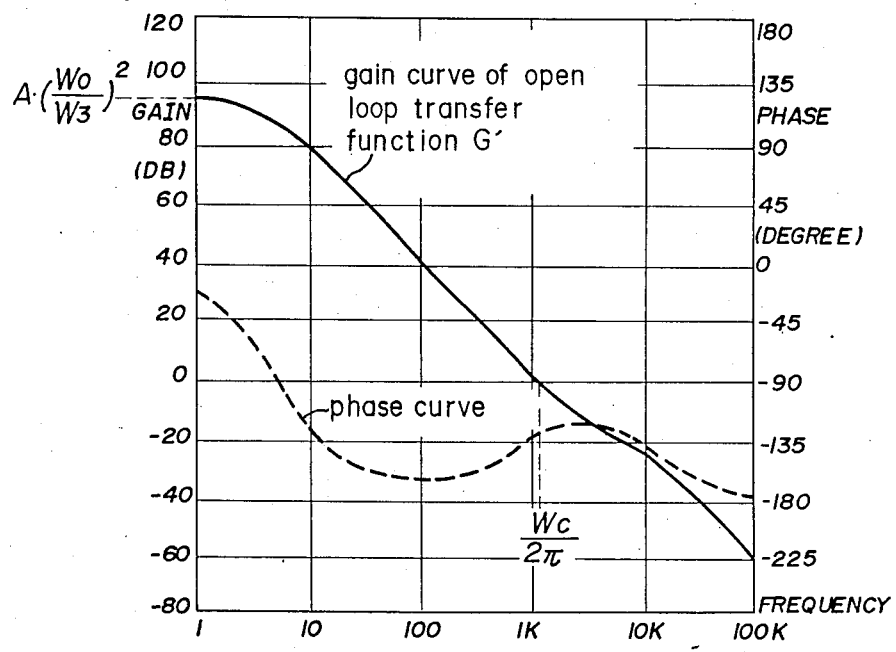
FIG. 25 is a board diagram of the open loop transfer function G' of FIG. 23.
Figure 26:
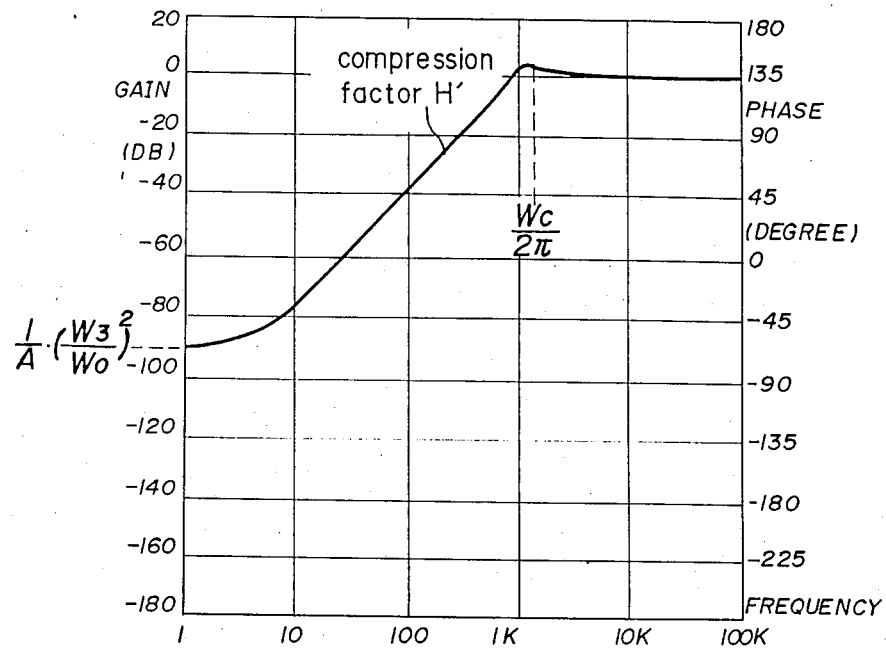
FIG. 26 is a frequency characteristic chart of the compression factor H'.
Figure 27:
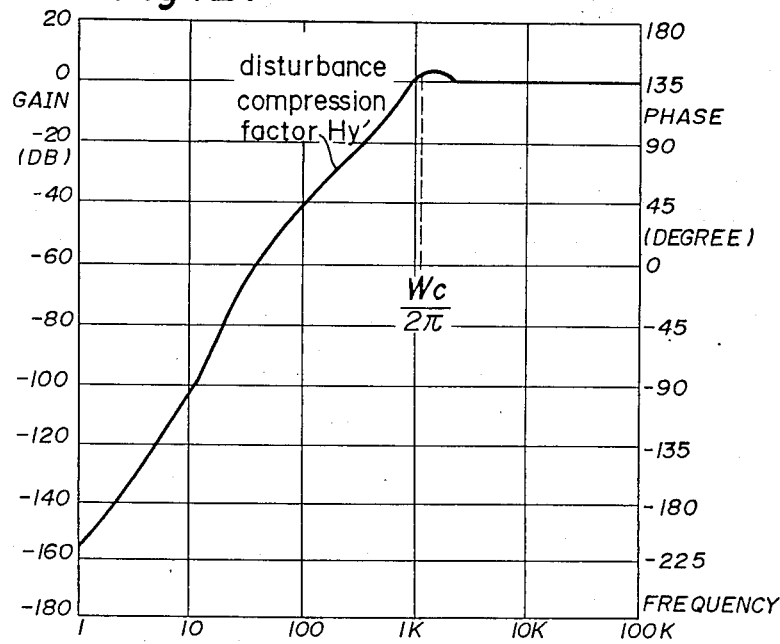
FIG. 27 is a frequency characteristic chart of the disturbance compression factor $H_Y'$.
Figure 28:
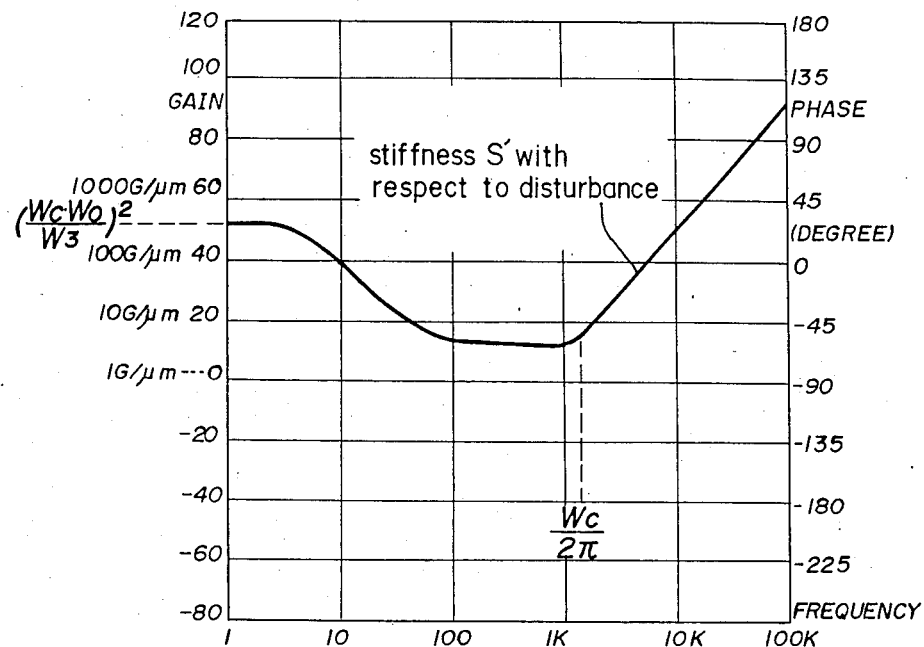
FIG. 28 is a frequency characteristic chart of the stiffness S'.

FIG. 24 through FIG. 28 show the characteristics in the radial controlling system of FIG. 23. FIG. 24 is a board diagram of the phase lag compensating circuit U'; FIG. 25 is a board diagram of the open loop transfer function G'; FIG. 26 is a frequency characteristic chart of the compression factor H'; FIG. 27 is a frequency characteristic chart of the disturbance compression factor $H_Y'$; FIG. 28 is a frequency characteristic chart of the stiffness S'.

C. Parallel Controlling of the Radial Actuator and the Linear Motor (a) First, a kinetic model and a controlling system will be described, which are adapted to perform the parallel controlling operation of the radial actuator mechanism and the linear motor mechanism in a case where the radial actuator mechanism is driven with the electromagnetic force through the supporting operation of the objective lens with two parallel springs.

(a-1) Kinetic Model

Figure 29:
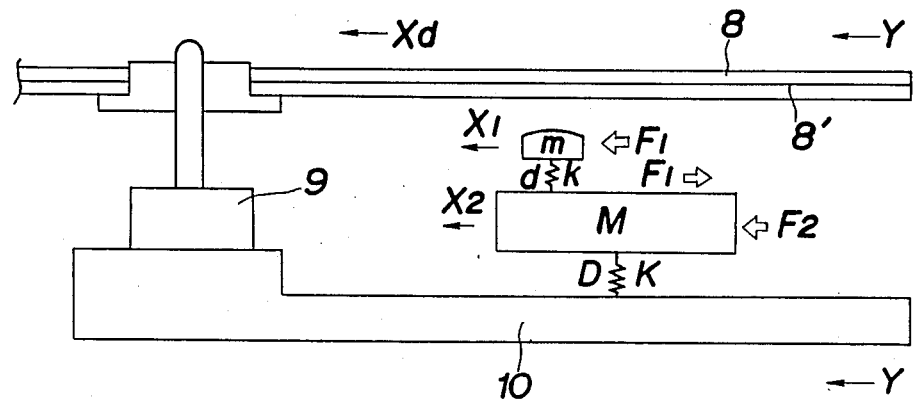
FIG. 29 is a model construction view for illustrating the kinetic model of the parallel controlling system.

FIG. 29 is an illustrating view for illustrating the kinetic model. In FIG. 29, a reference m is a radial actuator moving-part weight; a reference k is a spring constant of a radial actuator moving-part support spring; a reference d is a damping factor of a radial actuator moving-part support spring; a reference M is a linear motor moving-part weight, a reference K is a spring constant of the slide bearing of the linear motor; a reference D is a damping factor of the slide bearing of the linear motor; a reference $X_1$ is a radial actuator moving-part displacement to be caused by the radial actuator driving force $F_1$; a reference $X_2$ is a linear motor moving-part displacement to be caused by the linear motor driving force $F_2$; a reference $X_d$ is disk displacement; a reference Y is disturbance oscillation.

The kinetic equation of the kinetic model is $$\begin{cases} m(\ddot{X}_1 + \ddot{X}_2 + \ddot{Y}) = F_1 - kX_1 - d\dot{X}_1 \\ M(\ddot{X}_2 + \ddot{Y}) = F_2 - KX_2 - D\dot{X}_2 - (F_1 - kX_1 - d\dot{X}_1) \end{cases}$$

If the kinetic equation is Laplace-transformed, $$\begin{cases} F_1 = (ms^2 + ds + k)X_1 + ms^2 X_2 \times ms^2 Y \\ F_2 = ms^2 X_1 + \{(M+m)S^2 + Ds + K\}X_2 + (M+m)S^2 Y_0 \end{cases}$$

If it is converted into a displacement dimension equation, $$\begin{cases} \dfrac{F_1}{k} = \left( \dfrac{m}{k} S^2 + \dfrac{d}{k} S + 1 \right) X_1 + \dfrac{m}{k} S^2 X_2 + \dfrac{m}{k} S^2 Y \\ \dfrac{F_2}{K} = \dfrac{m}{K} S^2 X_1 + \left( \dfrac{M+m}{K} S^2 + \dfrac{D}{K} S + 1 \right) X_2 + \dfrac{M+m}{K} S^3 Y_o \end{cases}$$

Assume that the transfer function in the radial actuator transfer function with respect to the radial actuator driving force $F_1$ (or $F_1/K$ in the displacement dimension) of the radial actuator moving-part displacement $X_1$ is $G_R$, and the the linear motor transfer function with respect to the linear motor driving force $F_2$ (or $F_2/K$ in the displacement dimension) of the linear motor moving-part displacement $X_2$ is $G_L$, and $$G_R = \dfrac{1}{\dfrac{m}{k} S^2 + \dfrac{d}{k} S + 1} = \dfrac{\omega_R^2}{S^2 + 2\zeta_R \omega_R S + \omega_R^2}$$

$$G_L = \dfrac{1}{\dfrac{M+m}{K} S + \dfrac{D}{K} S + 1} = \dfrac{\omega_L^2}{S^2 + 2\zeta_L \omega_L S + \omega_L^2}$$

wherein $\omega_R$ is a radial actuator resonance frequency, $\zeta_R$ is a radial actuator damping factor, $\omega_L$ is a linear motor resonance frequency, $\zeta_L$ is a linear motor damping factor.

$$\omega_R = \sqrt{\dfrac{k}{m}}, \quad \zeta_R = \dfrac{d}{2\sqrt{mk}}, \quad \omega_L = \sqrt{\dfrac{K}{M+m}},$$

$$\zeta_L = \dfrac{D}{2\sqrt{(M+m)K}}.$$

Then, $F_1/K$, $F_2/K$ are respectively inputted into the displacement dimension into $U_1$, $U_2$. The kinetic equation is rewritten with the use of the $G_R$, $G_L$, and $U_1$, $U_2$.

$$\begin{cases} U_1 = \dfrac{1}{G_R} \cdot X_1 + \dfrac{S^2}{\omega_R^2} \cdot X_2 + \dfrac{S^2}{\omega_R^2} \cdot Y \\ U_2 = \dfrac{m}{M+m} \cdot \dfrac{S^2}{\omega_L^2} X_1 + \dfrac{1}{G_L} \cdot X_2 + \dfrac{S^2}{\omega_L^2} \cdot Y \end{cases}$$

As the radial actuator moving-part weight m is sufficiently lighter as compared with the linear motor moving-part weight M, $[m/(M+m)] \ll 1$ $$\begin{cases} U_1 = \dfrac{1}{G_R} \cdot X_1 + \dfrac{S^2}{\omega_R^2} \cdot X_2 + \dfrac{S^2}{\omega_R^2} \cdot Y \\ U_2 = \dfrac{1}{G_L} \cdot X_2 + \dfrac{S^2}{\omega_L^2} \cdot Y \end{cases}$$

Thus, the outputs $[X_1, X_2]$ with respect to the inputs $[U_1, U_2, Y]$ are $$\begin{cases} X_1 = G_R \cdot U_1 - \dfrac{S^2}{\omega_R^2} G_R \cdot G_L \cdot U_2 - \dfrac{S^2}{\omega_R^2} G_R \cdot \left( 1 - \dfrac{S^2}{\omega_R^2} G_L \right) \cdot Y \\ X_2 = G_L \cdot U_2 - \dfrac{S^2}{\omega_L^2} G_L \cdot Y \end{cases}$$

(a-2) Controlling System

Figure 30:
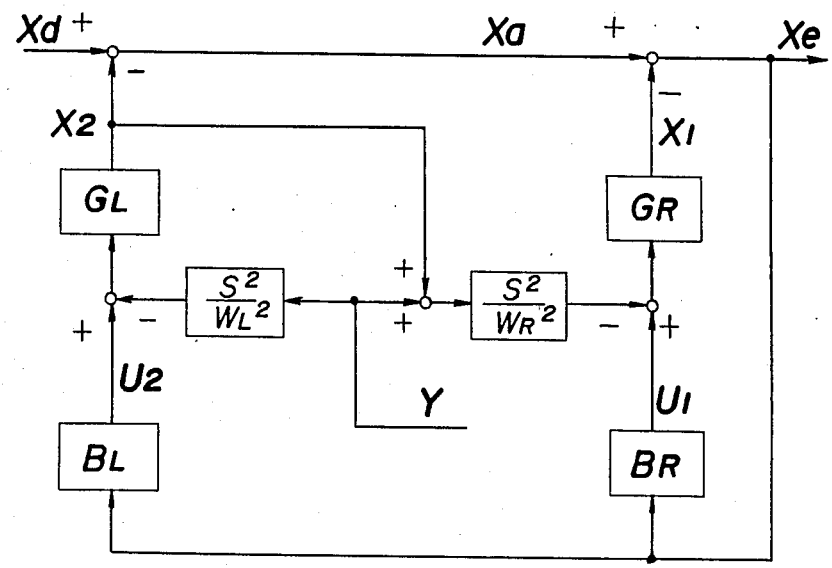
FIG. 30 is a block diagram of FIG. 29.

FIG. 30 is a block diagram for illustrating the controlling system. In FIG. 30, the following equations are established. Radial follow-up error (Xe)=disk displacement (Xd)-light beam position displacement ($Xl=X_1+Y_2$). And linear motor follow-up error (namely, radial actuator burden displacement) (Xa)=-disk displacement (Xd)-linear motor moving-portion displacement ($X_2$). The $X_1$ is the radial actuator moving-part displacement.

The parallel controlling operation by the radial actuator mechanism and the linear motor mechanism is effected through the feedback of the radial follow-up error Xe to the radial actuator driving force and the linear motor driving force. Assume that the feedback transfer functions of the radial follow-up error Xe to the inputs $U_1$, $U_2$ are respectively $B_R$, $B_L$, $U_1=B_R \cdot Xe$, $U_2=B_L \cdot Xe$. Also, the open loop transfer function to be transmitted to the light beam position displacement $Xl(=X_1+X_2)$ from the radial follow-up error Xe is $G=(Xl)/(Xe)$. The disturbance transfer function GY to be transmitted to the light beam position displacement $Xl(=X_1+X_2)$ from the disturbance oscillation Y is $G_Y=(Xl)/Y$. Accordingly, $Xl=G \cdot Xe+G_Y \cdot Y$. Also, $Xe=Cd-Xe$, $$Xe = \frac{1}{1+G} \cdot Xd - \frac{G_Y}{1+G} \cdot Y$$

Then, assume that the compression factor in the closed transfer function with respect to the disk displacement Xd of the radial follow-up error Xe is H, and $$H = \left|\frac{Xe}{Xd}\right| = \left|\frac{1}{1+G}\right|$$

Also, the disturbance compression factor $H_Y$ with respect to the disturbance oscillation Y of the radial follow-up error Xe is $$H_Y = \left|\frac{Xe}{Y}\right| = \left|\frac{G_Y}{1+G}\right| = |H \cdot G_Y|$$

Also, the linear transfer function Ga to be transmitted from the linear motor follow-up error Xa to the linear motor moving-part displacement $X_2$ is $Ga=X_2/Xa$. The disturbance transfer function $Ga_Y$ to be transmitted from the disturbance oscillation Y to the linear motor moving-part displacement $X_2$ is $Ga_Y=X_2/Y$. Thus, $X_2=Ga \cdot Xa+Ga_Y \cdot Y$. Also, the linear motor follow-up error in the radial actuator burden displacement Xa is $$Xa = \frac{1}{1+Ga} \cdot Xd - \frac{Ga_Y}{1+Ga} \cdot Y$$

wherein $Xa=Xd-X_2$.

Accordingly, the compression factor in the closed loop transfer function with respect to the disk displacement Xd and the linear motor follow-up error Xa is Ha, and $$H_a = \left|\frac{Xa}{Xd}\right| = \left|\frac{1}{1+Ga}\right|$$

Also, the disturbance compression factor $Ha_Y$ with respect to the disturbance oscillation of the linear motor follow-up error Xa is $$Ha_Y = \left|\frac{Xa}{Y}\right| = \left|\frac{Ga_Y}{1+Ga}\right| = |H_a \cdot Ga_Y|$$

The phase lag argG of the open loop transfer function $G(=Xl/Xe)$ is ($-180°$) or more and the compression factor $H(=|Xe/Xd|)$ is approximately $H \approx 1/|G|$ in the frequency scope wherein the gain $|G|$ is 1 or larger. Accordingly, the compression factor H showing the performance of the controlling system is determined by the gain difference between the gain $|G|$ ($\omega_c$) in the cut-off frequency $\omega_c$ which is a frequency of $|H| \approx 1$ and the gain $|G|$ ($\omega_r$) in the disk rotation frequency $\omega_r$ which is a frequency having the largest component among the frequency components of the disk displacement Xd. Therefore, the larger the gain difference becomes, the better the compression factor H becomes.

Also, the stability of the controlling system largely depends upon the phase of the open loop transfer function G as far as the vicinity to the cut-off frequency $\omega_c$. As the margin provided before the argG in $|G|=1$ (namely, $\omega=\omega_c$) reaches ($-180°$) becomes the phase margin, the phase margin is normally set to be between 40° to 50°. Accordingly, the argG in the $|G|=1$ is approximately ($-140°$) through ($-130°$). The argG is unstable as it becomes closer to ($-180°$) under the condition of $\omega<\omega_c$, and is oscillated in argG$\approx -180°$.

From the above-described, the compression factor of the controlling system and stability can be roughly estimated by the gain curve of the open loop transfer function G and the phase curve. Similarly, the compression factor and stability of the linear motor can be roughly estimated by the gain curve and phase curve of the linear transfer constant Ga.

The radial follow-up error Xe and the radial actuator displacement Xa in a case wherein the parallel controlling operation has been performed in the above-described system are $$X_c = \frac{1}{\left\{G_R \cdot B_R + G_L\left(1 - \frac{s^2}{\omega_R^2} \cdot G_R\right) \cdot B_L + 1\right\}} \cdot Xd$$

$$+ \frac{\left\{\frac{s^2}{\omega_R^2}G_R + \frac{s^2}{\omega_L^2} \cdot G_L \cdot \left(1 - \frac{s^2}{\omega_R^2} \cdot G_R\right)\right\}}{\left\{G_R \cdot B_R + G_L\left(1 - \frac{s^2}{\omega_R^2} \cdot G_R\right) B_L + 1\right\}} \cdot Y$$

$$\begin{cases} X_a = \cfrac{1}{\cfrac{G_L \cdot B_L}{G_R\left(B_R - \cfrac{S^2}{\omega_R^2} \cdot G_L \cdot B_L\right) + 1} + 1} \cdot X_d \\ \\ + \cfrac{\cfrac{S^2}{\omega_L^2} \cdot G_L \cdot \left\{1 + \cfrac{G_R}{\omega_R^2} \cdot (R_R \omega_R^2 - B_L \omega_L^2)\right\}}{G_R\left(B_R - \cfrac{S^2}{\omega_R^2} \cdot G_L \cdot B_L\right) + 1} \cdot Y \\ \cfrac{G_L \cdot B_L}{G_R\left(B_R - \cfrac{S^2}{\omega_R^2} \cdot G_L \cdot B_L\right) + 1} \end{cases}$$

(b) Next, there will be described a kinetic model controlling system for performing parallel controlling operation of the radial actuator mechanism and the linear motor mechanism in a case where the incident optical-axis of the objective lens is adapted to be inclined through the rotation of the mirror in the radial actuator mechanism with the use of the electromagnetic force, to laterally displace the light beam position.

(b-1) Kinetic Model

Figure 31:
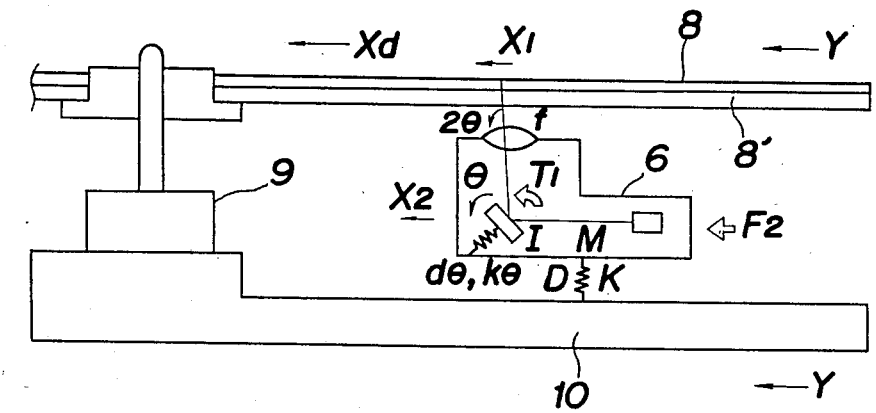
FIG. 31 is a model construction view for illustrating the kinetic model of the other type of the parallel controlling system.

FIG. 31 is an illustrating view of the kinetic model. In FIG. 31, a reference numeral is a radial actuator moving-part inertia moment; a reference $K\theta$ is a rotary spring constant of the radial actuator moving-part support rotary spring, a reference $d\theta$ is a damping factor of the radial actuator moving-part support rotary spring, a reference M is a linear motor moving-part weight, a reference K is a spring constant of the slide bearing of the linear motor, a reference D is a damping factor of the slide bearing of the linear motor, a reference $\theta$ is a radial actuator moving-part rotary angle to be caused by the radial actuator driving torque $T_1$, a reference f is an objective lens focus distance, a reference $X_1$ is a light beam position displacement to be caused by the optical axis rotation, a reference $X_2$ is a linear motor moving-part displacement to be caused by the linear motor driving force $F_2$, a reference $X_d$ is a disk displacement, and a reference Y is a disturbance oscillation. In this case, the optical-axis rotation angle is $2\theta$ and the light beam position displacement $X_1$ to be caused by the optical-axis rotation is approximately $X_1 = 2\theta_1 \cdot f$.

The kinetic equation of the kinetic model is $$\begin{cases} I\ddot{\theta} = T_1 - k_\theta \cdot \theta - d_\theta \cdot \dot\theta \\ M(\ddot{X}_2 + \ddot{Y}) = F_2 - KX_2 - DX_2 \end{cases}$$

If the kinetic equation is Laplace-transformed, $$\begin{cases} 2fT_1 = (Is^2 + d_\theta s + k\theta)X_1 \\ F_2 = (Ms^2 + Ds + K)X_2 + Ms^2Y \end{cases}$$

It is converted into a displacement dimension, $$\begin{cases} \cfrac{2fT_1}{k_\theta} = \left(\cfrac{I}{k_\theta} S^2 + \cfrac{d_\theta}{k_\theta} S + 1\right) X_1 \\ \cfrac{F_2}{K} = \left(\cfrac{M}{K} S^2 + \cfrac{D}{K} S + 1\right) X_2 + \cfrac{M}{K} S^2 Y \end{cases}$$

Assume that the transfer function with respect to the radial actuator driving-torque $T_1$ (or $2fT_1/K_\theta$ in the displacement dimension) of the light beam position displacement $X_1$ to be caused by the optical-axis rotation is a radial actuator transfer function $G_R$, and the transfer function with respect to the linear driving force $F_2$ (or $F_2/K$ in the displacement dimension) of the linear motor moving-part displacement $X_2$ is a linear motor transfer function $G_L$, and $$G_R = \cfrac{1}{\cfrac{I}{k_\theta} S^2 + \cfrac{d_\theta}{k_\theta} + 1} = \cfrac{\omega_R^2}{S^2 + 2\zeta_R'\omega_R S + \omega_R^2}$$

$$G_L = \cfrac{1}{\cfrac{M}{K} S^2 + \cfrac{D}{K} S + 1} = \cfrac{\omega_L^2}{S^2 + 2\zeta_L \omega_L S + \omega_L^2}$$

wherein $\omega_R$ is a radial actuator resonance frequency, $\zeta_R$ is a radial actuator damping factor, $\omega_L$ is a linear motor resonance frequency, $\zeta_L$ is a linear motor damping factor, $$\omega_R = \sqrt{\cfrac{k_\theta}{I}},\ \zeta_R = \cfrac{d_\theta}{2\sqrt{Ik_\theta}},\ \omega_L = \sqrt{\cfrac{K}{M}},\ \zeta_L = \cfrac{D}{2\sqrt{MK}}$$

Then, input $2fT_1/K_\theta$, $F_2/K$ respectively into the displacement dimension into $U_1$, $U_2$, and rewrite the kinetic equation with the use of the $G_R$, $G_L$ and $U_1$, $U_2$, and $$\begin{cases} U_1 = \cfrac{1}{G_R} \cdot X_1 \\ U_2 = \cfrac{1}{G_L} \cdot X_2 + \cfrac{S^2}{\omega_L^2} \cdot Y \end{cases}$$

Thus, the outputs $[X_1, X_2]$ with respect to the inputs $[U_1, U_2, Y]$ are $$\begin{cases} X_1 = G_R \cdot U_1 \\ X_2 = G_L \cdot U_2 - \cfrac{S^2}{\omega_L^2} \cdot G_L \cdot Y \end{cases}$$

(b-2) Controlling system

Figure 32:
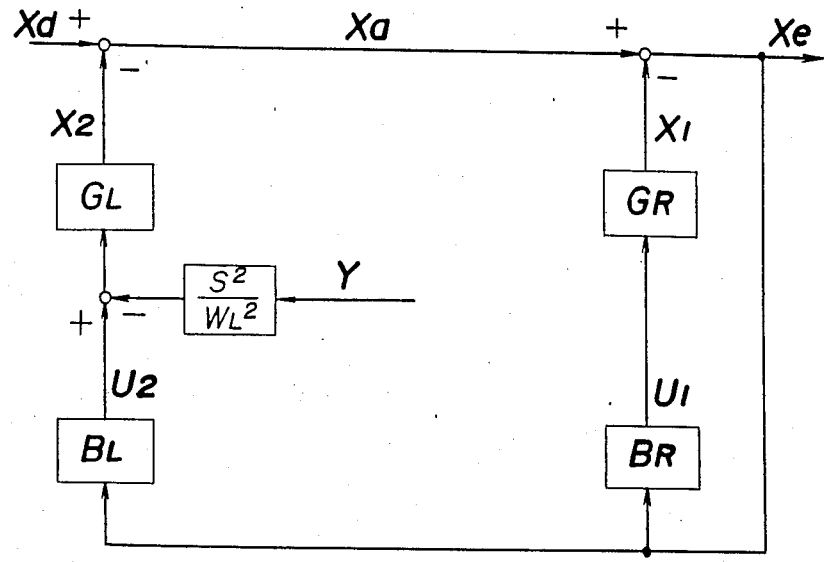
FIG. 32 is a block diagram of FIG. 31.

FIG. 32 is a block diagram for illustrating the controlling system. As the description of this controlling system is the same as that of the (a-2), the summary is omitted.

The radial follow-up error Xe, the radial actuator displacement Xa in a case where the parallel controlling operation has been performed in this system are $$\begin{cases} Xe = \dfrac{1}{(G_R \cdot B_R + G_L \cdot B_L + 1)} \cdot Xd + \dfrac{\dfrac{S^2}{\omega_L^2} \cdot G_L}{(G_R \cdot B_R + G_L \cdot B_L + 1)} \cdot Y \\[2ex] Xa = \dfrac{1}{\dfrac{G_L \cdot B_L}{G_R \cdot B_R + 1} + 1} \cdot Xd + \dfrac{\dfrac{S^2}{\omega_L^2} \cdot G_L}{\dfrac{G_L \cdot B_L}{G_R \cdot B_R + 1} + 1} \cdot Y \end{cases}$$

(c) The first conditions, i.e., the ratio between the low-frequency gain $A_L$ of the feed-back transfer function to the linear motor and the low-frequency gain $A_R$ of the feedback transfer function to the radial actuator is made to coincide with the square of the ratio between the resonance frequency $\omega_R$ of the radial actuator and the resonance frequency $\omega_L$ of the linear motor. Namely, $A_L/A_R = \omega_R^2/\omega_L^2$ will be described.

The feedback transfer functions $B_R$, $B_L$ are represented by the low-frequency gains $A_R$, $A_L$ and the servo-compensating circuit transfer function C, $B_R = A_R \cdot C$, $B_L = A_L \cdot C$. Assume that the ratio between the low-frequency gains $A_L$ and $A_R$ is $\alpha \cdot (\omega_R/\omega_L)^2$, and from $A_L/A_R = \alpha(\omega_R/\omega_L)^2$, $$\begin{cases} B_R = A_R \cdot C \\[1ex] B_L = \alpha \cdot \left(\dfrac{\omega_R}{\omega_L}\right)^2 \cdot A_R \cdot C \end{cases}$$

(c-1) There will be described a parallel controlling system in a case where the radial actuator mechanism designed to support the objective lens by two parallel springs and is driven with the use of the electromagnetic force.

In the case of the parallel controlling system, the disturbance compression factor $H_{aY}$ with respect to the disturbance oscillation Y of the linear motor follow-up error Xa will be considered. The $H_{aY}$ is obtained as follows through substitution of the above-described values into the $B_R$, $B_L$.

$H_{aY} =$ $$\left| \dfrac{\dfrac{S^2}{\omega_L^2} G_L \cdot \{1 + A_R \cdot C \cdot G_R(1-\alpha)\}}{1 + A_R \cdot C \left\{ G_R + \alpha \cdot G_L \cdot \left(\dfrac{\omega_R}{\omega_L}\right)^2 \cdot \left(1 - \dfrac{S^2 \omega_R}{\omega_R^2}\right) \right\}} \right|$$

From $1 \ll A_R$, $A_R G_R \gg 1$ in the low frequency zone. From $A_R G_L \gg 1$, $$H_{aY} \approx \left| \dfrac{(1+\alpha)}{\left\{ \dfrac{\omega_L^2}{S^2 G_L} + \alpha \left(\dfrac{\omega_R^2}{S^2 G_R} - 1\right) \right\}} \right|$$

From this equation, in $\alpha = 1$, namely, $A_L/A_R = \omega_R^2/\omega_L^2$, $H_{aY} \approx 0$ is established, and the $H_{aY}$ becomes smallest. As the movable range of the radial actuator is narrow, the disturbance compression factor $H_{aY}$ becomes smallest and the radial actuator displacement becomes smallest, whereby it has a large effect in increasing the stability of the radial parallel controlling system. Also, it is found out from the above points that the $A_L/A_R = \omega_R^2/\omega_L^2$ is optimum in value and is more desirable.

(c-2) There will be described the parallel controlling system in a case wherein the incident optical-axis of the objective lens is adapted to be inclined to displace the light beam position laterally through the rotation of the mirror with the use of the electromagnetic force in the radial actuator mechanism.

In the case of the parallel controlling system, the open loop transfer function G and the linear transfer function Ga are considered. If the above-described values are substituted into the $B_R$, $B_L$ to obtain the G and Ga, $$\begin{cases} G = G_R B_R + G_L B_L = A_R \cdot C \cdot G_R \cdot \left( 1 + \alpha \cdot \dfrac{\omega_R^2}{\omega_L^2} \cdot \dfrac{G_L}{G_R} \right) \\[2ex] Ga = \dfrac{G_L B_L}{G_R B_R + 1} = \dfrac{\alpha \cdot \dfrac{\omega_R^2}{\omega_L^2} \cdot G_L}{G_R + \dfrac{1}{A_R \cdot C}} \end{cases}$$

Figure 33:
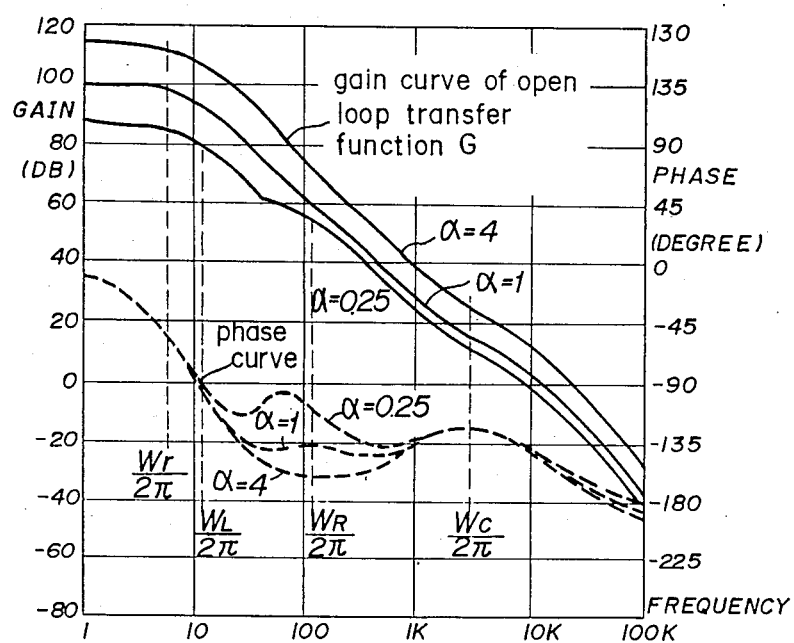
FIG. 33 is a board diagram of the open loop transfer function G of FIG. 32.
Figure 34:
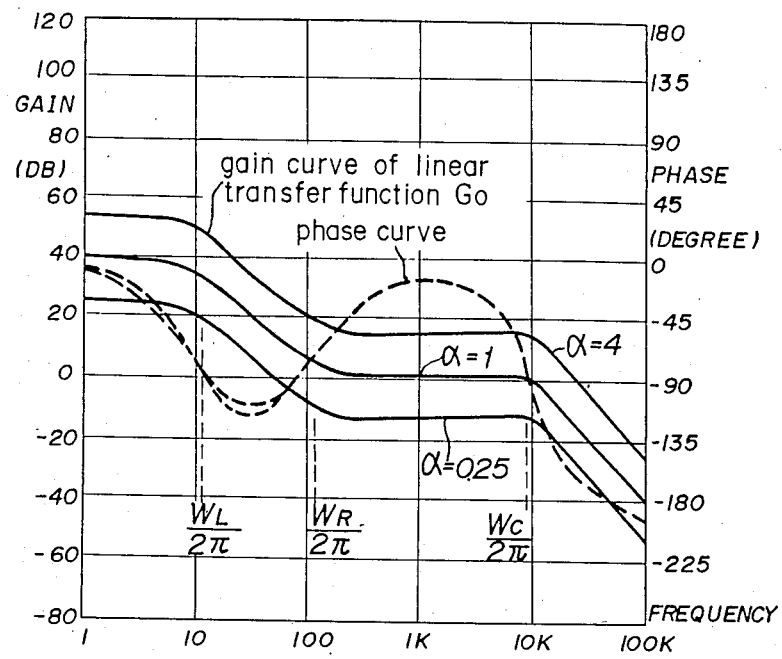
FIG. 34 is a board diagram of the linear transfer function of FIG. 32.

Here, see FIG. 33 showing the board diagram of the open transfer function G in the parallel controlling system and FIG. 34 showing the board diagram of the linear transfer function Ga in which both figures relate to $\alpha = 0.25, 1, 4$ respectively, while the solid line shows a gain curve and the dotted line shows the phase curve. Also, in the open loop tranfer function G and the linear transfer function Ga, the servo-compensating circuit transfer function C is considered the phase lead compensation because of the controlling safety compensation.

Namely, $$C = \dfrac{\dfrac{S}{\omega_3} + 1}{\dfrac{S}{\omega_4} + 1} \quad (\omega_R \ll \omega_3 < \omega_4)$$

In the observation of the gain curve of FIG. 33, compare $|G|(\omega_4)$ with $|G|(\omega_c)$ when the low frequency gain $A_R$ has been determined so that $|G|(\omega_c) \approx 1$ may be established with the largest frequency of the phase margin as the cut-off frequency $\omega_c$, and in the $\alpha < 1$, the $|G|(\omega_r)$ becomes larger in proportion to the $\alpha$ as the $\alpha$ becomes larger, but when it is larger than $\alpha \approx 1$, the $|G|(\omega_r)$ becomes closer to a constant value if the $\alpha$ becomes larger, and does not become as large. It is found out from this point that it is better to make-larger than $\alpha \approx 1$.

It is found out from the observation of the gain curve of FIG. 34 that when it is smaller than the $\alpha \approx 1$, the frequency scope wherein the gain $|Ga|$ of the linear transfer function Ga becomes $1 < |Ga|$ is approximately $\omega_R$ and its vicinity or lower, while in the case of $\alpha > 1$, the frequency scope extends as far as the $\omega_c$ and its vicinity. As described hereinabove, the linear motor cannot expect the precise controlling operation from its construction because of influences of stick slips, etc. Thus, it is meaningless to extend the linear controlling zone as far as the high-frequency scope such as approximately $\omega_c$. Also, the action of the linear motor can be the disturbance of the radial actuator due to the non-linear movement. Accordingly, it is found out that $\alpha \approx 1$ or smaller is better.

From the above two points, it is optimum to have $\alpha \approx 1$, namely, $A_L/A_R \approx \omega_R^2/\omega_L^2$.

(d) The second conditions, namely, addition of the controlling current of the linear motor to the radial actuator controlling current through a secondary by-pass filter where the break-point frequency is $\omega_L$, i.e., linear motor resonance frequency, will be described hereinafter.

The description will be given on the assumption that the first conditions, i.e., $A_L/A_R = \omega_R^2/\omega_L^2$ explained in (c) are already satisfied.

When the above-described addition controlling operation is not effected, $$\begin{cases} B_R = A_R \cdot C \\ B_L = \left(\dfrac{\omega_R}{\omega_L}\right)^2 \cdot A_R \cdot C \end{cases}$$

as described hereinabove, but when the addition controlling operation has been effected, $$\begin{cases} B_R = \left(1 + \dfrac{S^2}{\omega_L^2} \cdot G_L\right) \cdot A_R \cdot C \\ B_L = \left(\dfrac{\omega_R}{\omega_L}\right)^2 \cdot A_R \cdot C \end{cases}$$

(d-1) There will be described a parallel controlling system in a case where the objective lens is supported with two parallel springs in the radial actuator mechanism and is driven with the use of the electromagnetic force.

Figure 35:
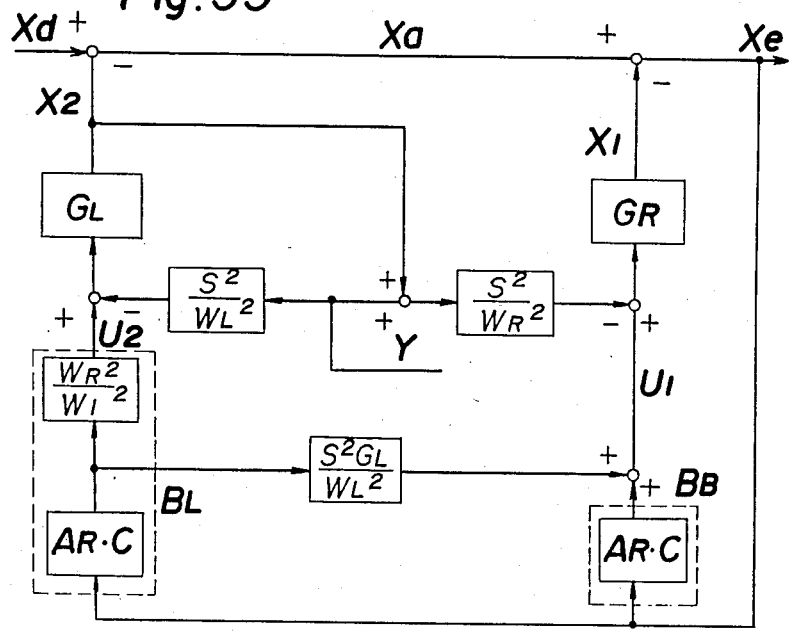
FIG. 35 is a block diagram for illustrating the addition controlling system.

A block diagram for illustrating a system of the addition controlling operation is shown in FIG. 35. In FIG. 35, a reference $B_R$ is shown in $A_R \cdot C$, and a reference $B_L$ is divided in two, $A_R \cdot C$ and $\omega_R^2/\omega_L^2$. Also, $S^2 G_L/\omega_L^2$ is the secondary by-pass filter wherein the break point frequency is $\omega_L$.

When the above-described addition controlling operation is not effected through the filter, $$\begin{cases} G = A_R \cdot C \cdot G_R \cdot \left\{1 + \dfrac{\omega_R^2}{\omega_L^2} \cdot \left(\dfrac{G_L}{G_R} - \dfrac{S^2}{\omega_R^2}\right)\right\} \\ Ga = \dfrac{\dfrac{\omega_R^2}{\omega_L^2} \cdot G_L}{G_R \cdot \left(1 - \dfrac{S^2}{\omega_L^2} G_L\right) + \dfrac{1}{A_R \cdot C}} \end{cases}$$

but when the above-described addition controlling operation has been effected, $$\begin{cases} G = A_R \cdot C \cdot G_R \cdot \left\{1 + \dfrac{\omega_R^2}{\omega_L^2} \cdot \dfrac{G_L}{G_R}\right\} \\ Ga = \dfrac{\dfrac{\omega_R^2}{\omega_L^2} \cdot G_L}{G_R + \dfrac{1}{A_R C}} \end{cases}$$

Figure 36:
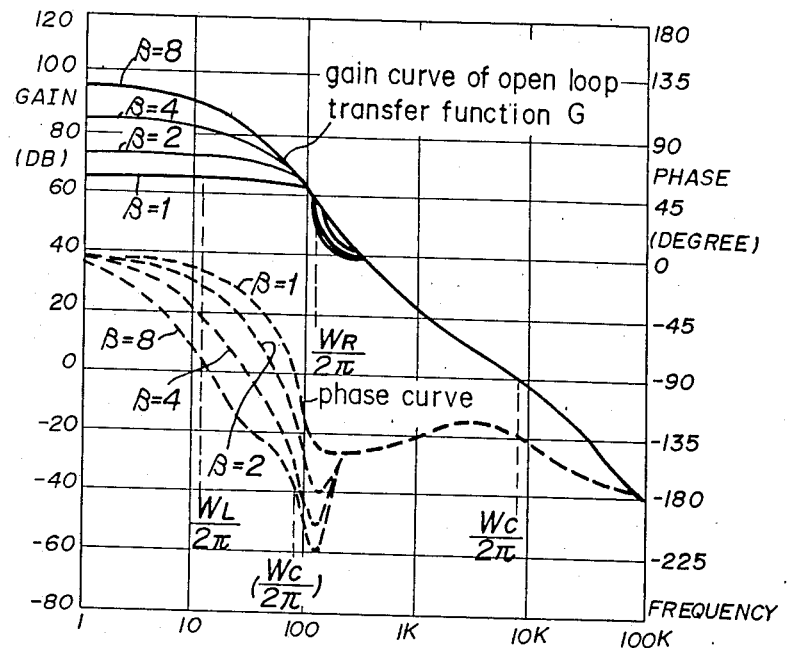
FIG. 36 is a board diagram of the open loop transfer function G of FIG. 30.
Figure 37:
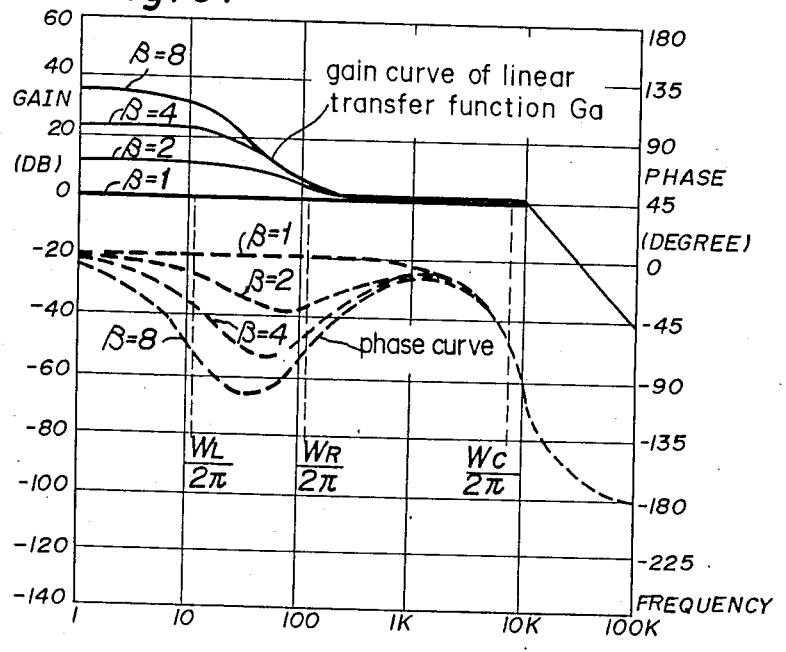
FIG. 37 is a board diagram of the linear transfer function Ga of FIG. 30.
Figure 38:
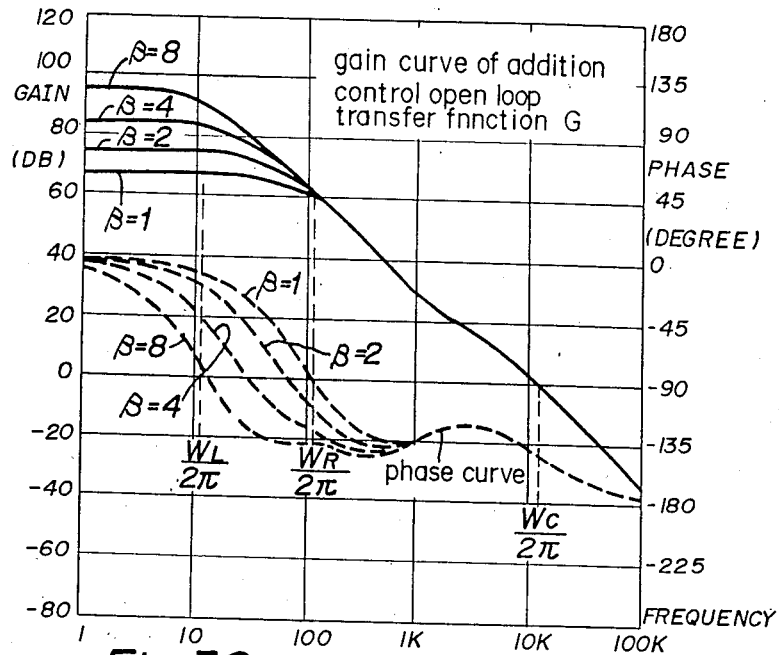
FIG. 38 is a board diagram of the open loop transfer function G of FIG. 35.
Figure 39:
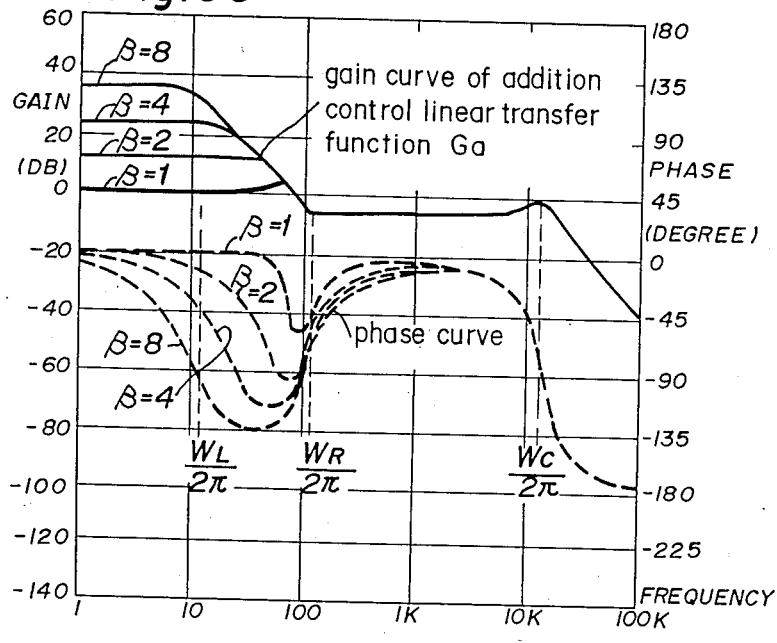
FIG. 39 is a board diagram of the linear transfer function Ga of FIG. 35.

FIG. 36 and FIG. 37 are respectively board diagrams of the open loop transfer function G and the linear transfer function Ga in a case where the above-described addition controlling operation has not been effected. FIG. 38 and FIG. 39 are respectively board diagrams of the open loop transfer function G and the linear transfer function Ga in a case where the above-described addition controlling operation has been effected. FIGS. 36 through 39 respectively show $\omega_R/\omega_L (=\beta) = 1, 2, 4, 8$, wherein the solid line shows the gain curve and the dotted line shows the phase curve. Also, in the open loop transfer function G and the linear transfer function Ga, the servo-compensating circuit transfer function C is the phase lead compensation for the controlling stable compensation.

In FIG. 37 and FIG. 39, the gain curve will be observed, and it is found out that the greater $\beta$ becomes, the more the low frequency gain of the linear transfer function Ga increases and the better the linear compression factor becomes. Namely, as $\beta$ becomes larger, the radial actuator burden Xa becomes smaller and the radial parallel controlling system becomes stable.

Then, in FIG. 36 and FIG. 38, the phase curve will be observed. In FIG. 36 wherein the addition controlling operation is not effected, a case exists wherein the phase $\arg G < -180°$ is established near the radial actuator resonance frequency $\omega_R$ when the $\beta$ becomes large, thus resulting in an extremely unstable condition. As the cut-off frequency $\omega_c$ can be set only in such a frequency scope as the phase $\arg G > -180°$ may be established, the $\omega_R$ becomes larger than the $\omega_c$ when the $\arg G < -180°$ is established in the radial actuator resonance frequency $\omega_R$ and its vicinity, so that the difference between the low frequency gain $|G|(\omega_r)$ and the $|G|(\omega_c)$ becomes extremely smaller. Accordingly, the compression factor H becomes worse so that the radial follow-up error cannot be minimized. On the other hand, in FIG. 38 wherein the addition controlling operation has been effected, the $\arg G$ is larger than $(-180°)$, thus being sufficiently stable in the scope as far as $\omega_c$ established in the high frequency. Accordingly, the $\beta$ can be made larger. Accordingly, the radial parallel controlling system of high compression factor and better stability can be provided.

(d-2) There will be described a parallel controlling system in a case wherein the incident optical axis of the objective lens is adapted to be tilted, through the rotation of the mirror with the use of electromagnetic force in the radial actuator mechanism, to laterally displace the light beam position.

In the parallel controlling system, the above-described addition controlling operation is not required so much if the gravity-center position of the rotation movable-part including the mirror coincides with the support-point position. However, when the gravity-point position of the rotation movable-part including the mirror is somewhat moved out of the support-point position, the kinetic model similar to the kinetic mode of the objective lens driving can be applied, and the addition controlling operation becomes effective as described in the above-described (d-1).

C'. There will be described respective damping factors in the parallel controlling operation of the radial actuator and the linear motor.

In the above-description, the concrete values of the damping factors $\zeta_R$, $\zeta_L$ of the radial actuator and the linear motor were not mentioned. However, when the $\zeta_R$, $\zeta_L$ are small in the $\zeta_R < 1$, $\zeta_L < 1$, the phase condition of the open loop transfer function G becomes unstable.

The loop transfer function G is represented by the same equation even in the parallel controlling system in a case where the incident optical axis of the objective lens is adapted to be tilted, through the rotation of the mirror with the use of electromagnetic force in the radial actuator, to laterally vary the light beam position, also even in the parallel controlling system in a case where the addition controlling operation has been performed as in the above description (d-1) as a mechanism for driving the radial actuator through the support of the objective lens with two parallel springs and by the use of the electromagnetic force. Thus, $$G = A_R \cdot C \cdot G_R \cdot \left\{ 1 + \frac{\omega_R^2}{\omega_L^2} \cdot \frac{G_L}{G_R} \right\}$$

The open loop transfer function G will be described hereinafter.

Figure 40:
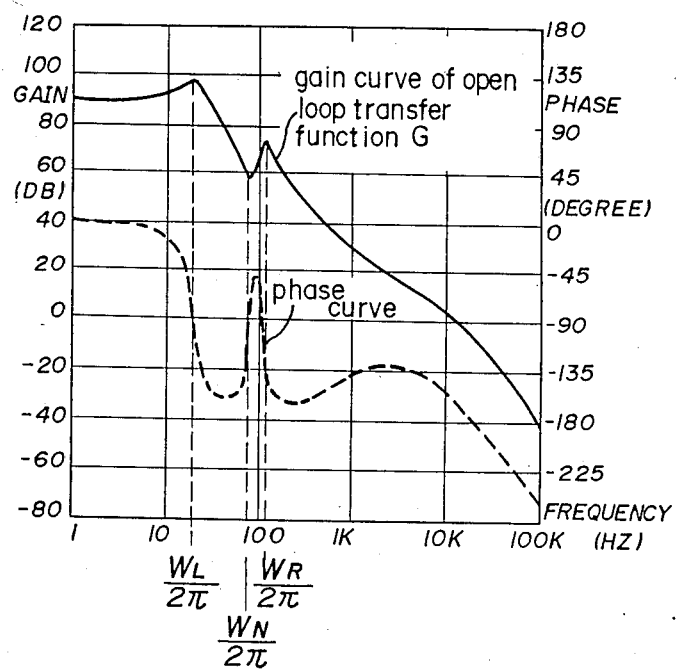
FIG. 40 is a board diagram of the open loop transfer function G in a case where $\zeta_L$, $\zeta_R$ are small in FIG. 32 or FIG. 35.

FIG. 40 is one example of the board diagram of the open loop transfer function G when the $\zeta_R$, $\zeta_L$ are smaller, and shows the case in which $\zeta_R = 0.1$, $\zeta_L = 0.2$. The phase condition is extremely disturbed between $\omega_L$ and $\omega_R$ in frequency $\omega$ and the gain condition also has a minimum value. Namely, assume that the frequency is $\omega_N$, and the phase difference between the radial actuator driving displacement and the linear motor driving displacement in the frequency $\omega_N$ is 90° or more, approximately 180°. Namely, the radial actuator and the linear motor are displaced in the reverse direction.

To stabilize such unstable condition as described hereinabove, it is necessary to make smaller the phase difference in the frequency range. That is to make the phase of the linear motor lead in the frequency range and the phase of the radial actuator log. Namely, make larger the damping factors $\zeta_L$, $\zeta_R$ of the linear motor and the radial actuator.

Figure 41:
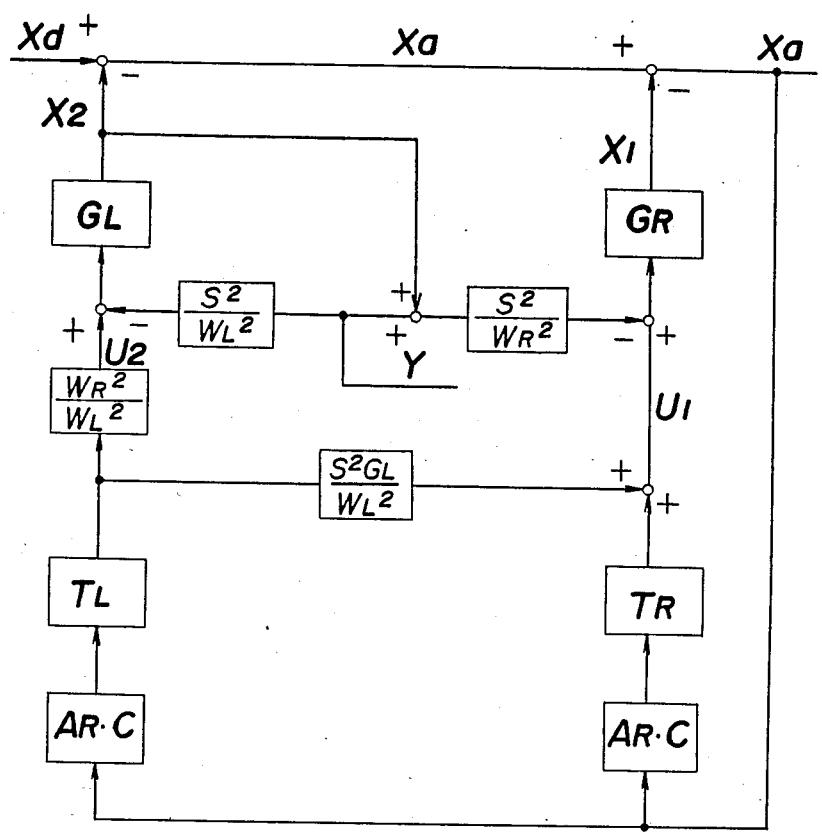
FIG. 41 is a block diagram of the parallel controlling system wherein the damping correction has been performed.
Figure 42:
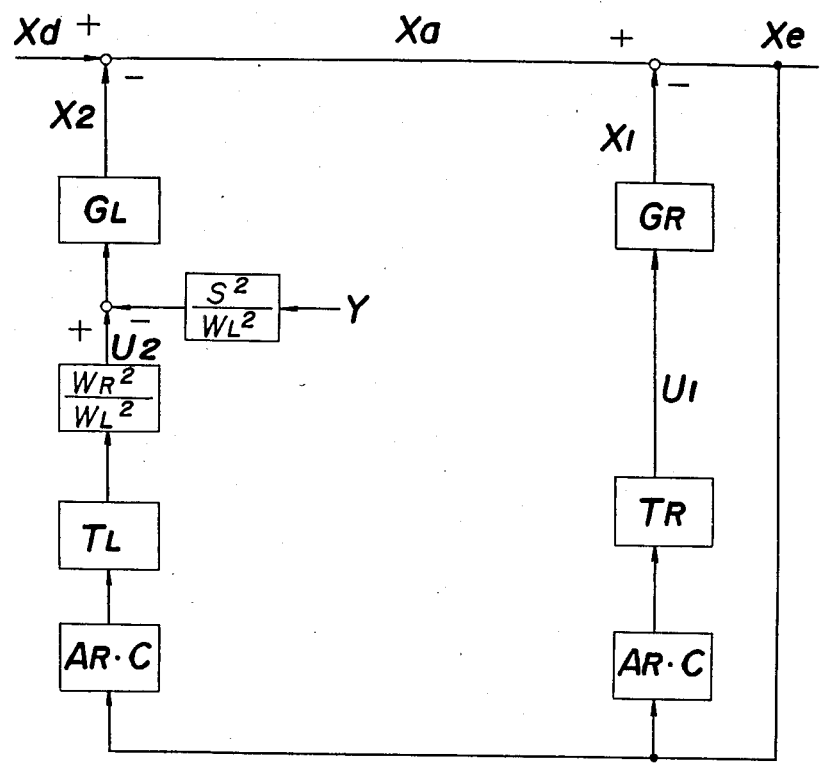
FIG. 42 is a block diagram of the parallel controlling system of the other type, wherein the damping correction has been performed.

FIG. 41 is a block diagram showing a controlling system wherein the damping correction has been performed in the parallel controlling system in a case wherein the addition controlling operation has been performed as a mechamism for suporting the objective lens with two parallel springs to drive the radial actuator with the use of electromagnetic force. Also, FIG. 42 is a block diagram showing a controlling system wherein the damping correction has been made in a parallel controlling system in a case where the incident optical-axis of the objective lens is adapted to be tilted to laterally displace the light beam position through the rotation of the mirror in the radial actuator with the use of the electromagnetic force.

Figure 43:
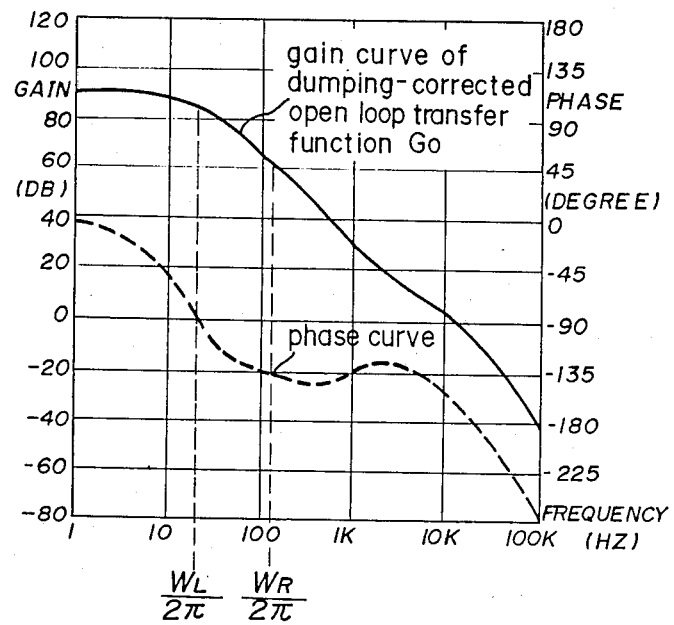
FIG. 43 is a board diagram of the open loop transfer function of FIG. 41 or FIG. 42.

FIG. 43 is a board diagram of the open loop transfer function G with the damping correction being performed, the solid line showing the gain curve, the dotted line showing the phase curve.

Apply the damping correction circuit T described in A to the radial actuator and the linear motor like this through the application of the radial actuator transfer function $G_R$ or the linear motor transfer function $G_L$ to the transfer function $G_O$ in the description of A and flow the respective currents through the damping correction circuits $T_R$, $T_L$ wherein the transfer functions are represented by $$T_R = \frac{S^2 + 2\zeta_R \omega_R S + \omega_R^2}{S^2 + 2\zeta_{R'} \omega_R S + \omega_R^2} \quad (\zeta_{R'} \geq 1)$$

$$T_L = \frac{S^2 + 2\zeta_L \omega_L S + \omega_L^2}{S^2 + 2\zeta_{L'} \omega_L S + \omega_R^2} \quad (\zeta_{L'} \geq 1)$$

thereby to assume that the apparent transfer functions of the radial actuator and the linear motor are $$G_{R'} = G_R \cdot T_R$$

$$G_{L'} = G_L \cdot T_L$$

and the apparent damping factors $\zeta_{R'}$, $\zeta_{L'}$ become $1 \leq \zeta_{R'}$, $1 \leq \zeta_{L'}$, thus resulting in a sufficiently stable opn loop transfer function G.

C''. There will be described the improvement of stiffness in the low frequency of the parallel control system between the radial actuator and the linear motor.

To improve the stiffness S in the low frequency through the application of the phase lag compensating circuit U' of the description of B, there are considered a case of applying the phase lag compensating circuit to the radial acuator controlling current, and a case of applying it to the linear motor controlling current.

Figure 44:
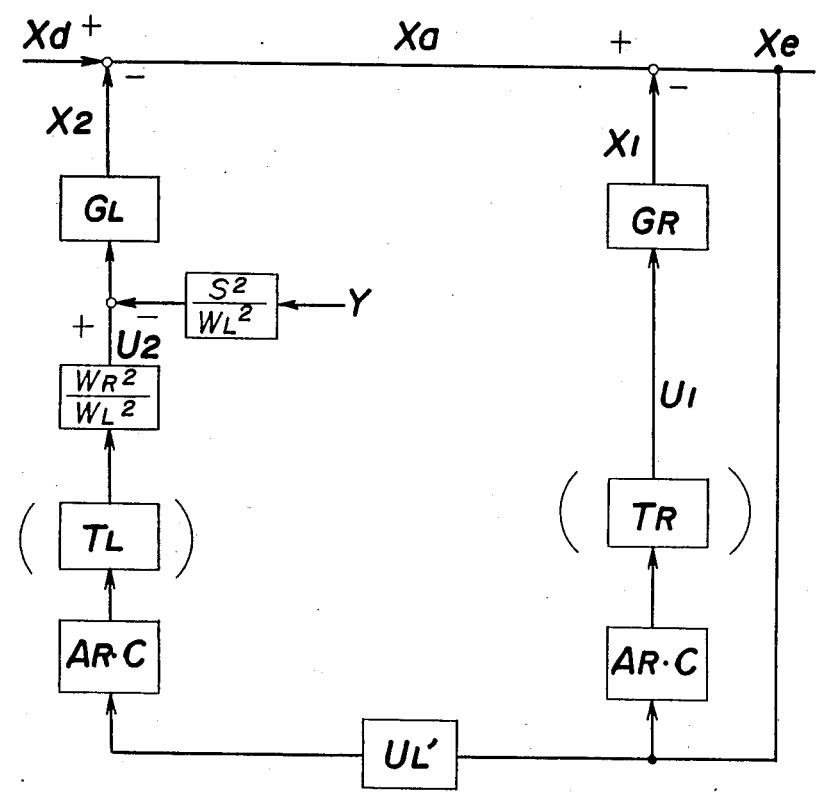
FIG. 44 is a block diagram of the parallel controlling system wherein the phase lag compensation has been performed.
Figure 45:
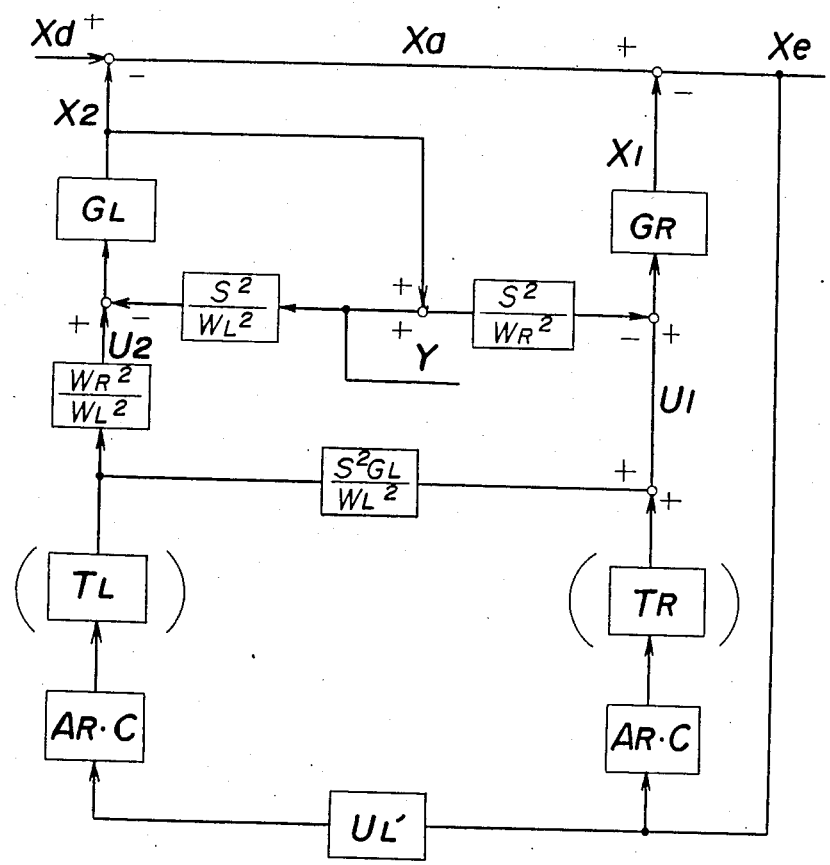
FIG. 45 is a block diagram of the parallel controlling system of the other type wherein the phase lag compensation has been performed.
Figure 46:
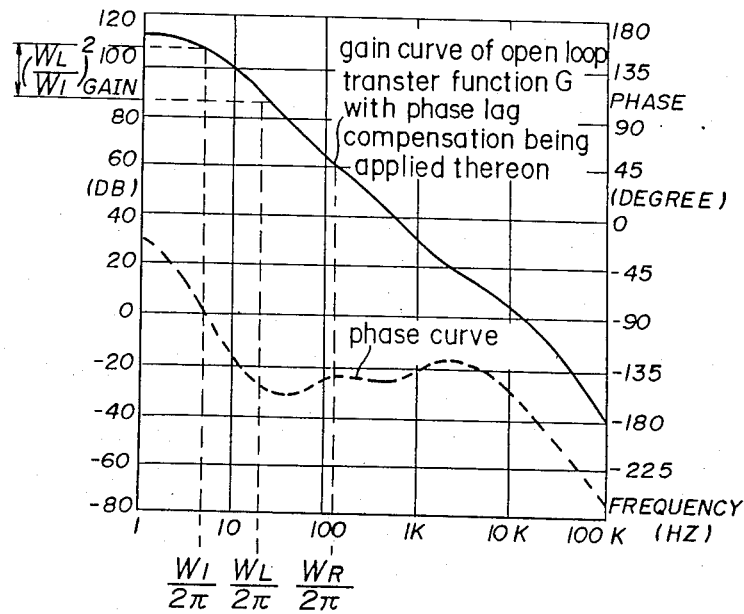
FIG. 46 is a board diagram of the open loop transfer function of FIG. 44 or FIG. 45.

In the parallel controlling system between the radial actuator and the linear motor, the resonance frequency $\omega_L$ of the linear motor is generally lower than the resonance frequency $\omega_R$ of the radial actuator and the linear transfer function $Ga(Ga = X2/Xa$, which is a transfer function to be transmitted from the linear motor follow-up error Xa to the linear motor moving-part displacement X2) apparently performs the phase lag compensation, namely, a function of increasing the low frequency gain of the radial actuator. Accordingly, it is more effective to apply the phase lag compensating circuit U' to the linear motor controlling current. A block diagram of the parallel controlling system with the phase lag compensating circuit U' being provided therein is shown in FIG. 44 and FIG. 45. FIG. 44 is a block diagram in the parallel controlling system in a case wherein the radial actuator mechanism has been driven by two parallel springs; FIG. 45 is a block diagram in the parallel controlling system in a case wherein the radial actuator mechanism has been driven through the mirror rotation, wherein $T_R$, $T_L$ are damping correction circuits which are applied according to the values, to the damping factors $\zeta_R$, $\zeta_L$ as in the description of C''. FIG. 46 is a board diagram of the open loop transfer function G of the parallel controlling system with the phase lag compensating circuit U', wherein the solid line is the gain curve and the dotted line is the phase curve.

The transfer function of the phase lag compensating circuit U' is $$U_L' = \left( \frac{S/\omega_L + 1}{S/\omega_1 + 1} \right)^2$$

In the application of the linear motor transfer function $G_L$ to the transfer function $G_O$ of the description of B, $\omega_0$ becomes $\omega_L$. Through the flowing of the linear motor controlling current through the phase lag compensating circuit U', the stiffness S with respect to the disturbance is improved $(\omega_L/\omega_1)^2$ times in the low frequency.

D. There will be described the supply of a memory signal to the radial actuator or the linear motor through the advance memorization of the controlling current for the radial control use.

(a) Conventional radial controlling system

Figure 47:
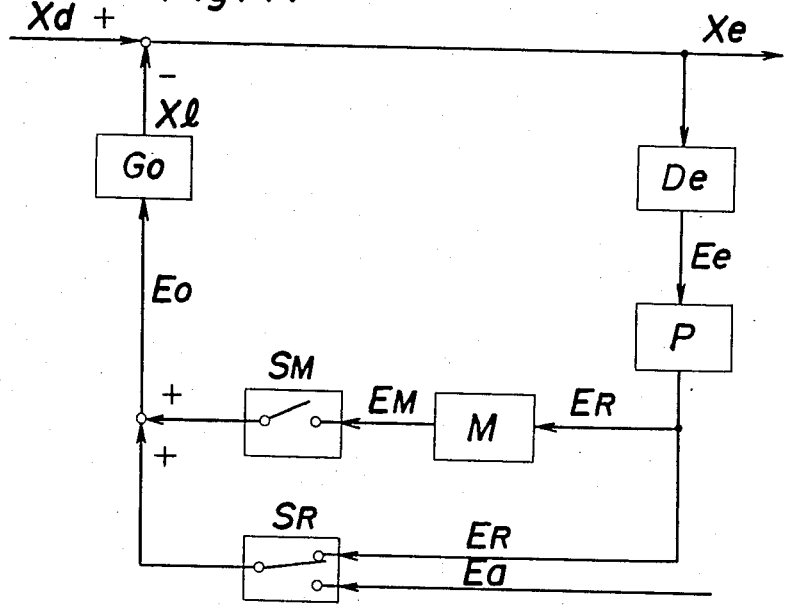
FIG. 47 is a block diagram of the radial controlling system wherein the conventional memory controlling operation has been performed.

FIG. 47 is a block diagram of the conventional radial controlling system. In FIG. 47, reference Xd is a disk displacement; reference Xl is a light beam position displacement; reference Xe is a radial error, reference Ee is a radial error signal; reference $E_R$ is a radial control driving circuit; reference $E_O$ is a radial actuator or a linear motor feed current; reference De is a detector for converting the radial error Xe into a radial error signal; reference P is a servo-compensating circuit for stabilizing the radial controlling operation; reference $G_O$ is a radial actuator or a linear motor for driving and displacing the light beam position in the radial direction; reference M is a memory for storing the radial control driving current $E_R$, reference $S_M$ is a switch for connecting memory signal $E_M$ to be added to the radial actuator or linear motor feed current $E_O$; reference $S_R$ is a change-over switch for connecting either the radial driving current $E_R$ or the access control driving current Ea is fed to the radial actuator or linear motor $G_O$.

The radial controlling operation is performed, first, with $S_M$:off, $S_R$:$E_R$ with the radial feedback controlling loop being closed. At this point, the radial control driving current $E_R$ is synchronized with the disk rotation and is memorized in the memory M. Then, the memory signal $E_M$ is added to the radial driving current $E_O$ with $S_M$:on, and $S_R$ is switched onto the $E_R$ side or the Ea side thereby to perform the radial control, the access control or the jump control.

However, in this conventional control, the memory signal $E_M$ stored in the memory M is the radial control driving current $E_R$. Besides the signal component for causing movement into the eccentric condition of the information track, there largely exist a noise component, a component caused by the individual track shape, and a high-frequency component for stabilizing the closed-loop servo condition. Thus, if the additional supply is made to the radial actuator or the linear motor, the radial setting condition does not become stable as is expected, but conversely becomes unstable because of the above-described components.

(b) Radial controlling system of the present invention

Figure 48:
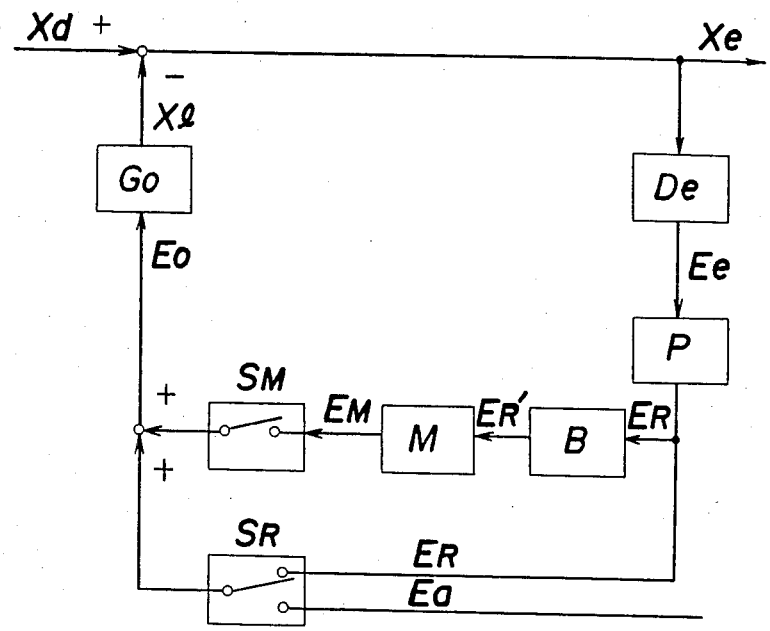
FIG. 48 is a block diagram of the radial controlling system wherein the memory controlling operation of the present invention has been performed.
Figure 49:
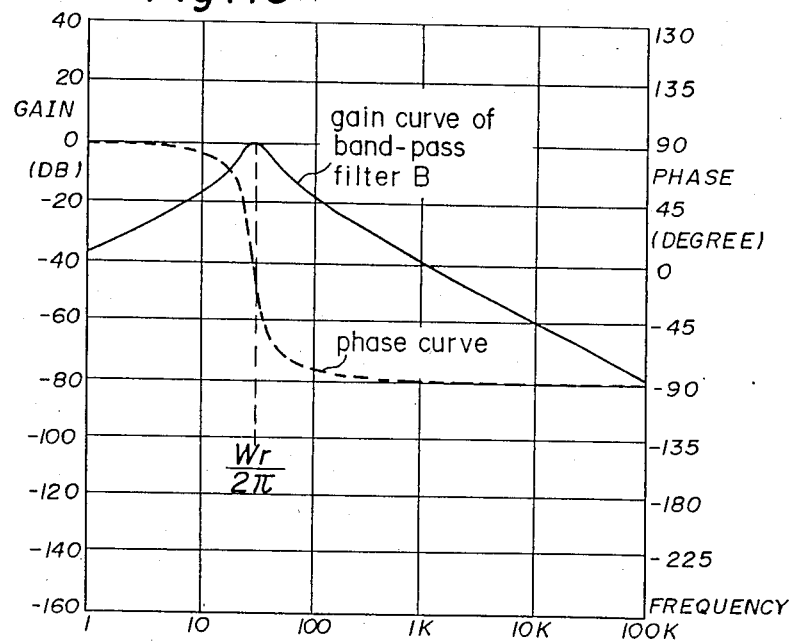
FIG. 49 is a board diagram of a band-pass filter B of FIG. 48.

FIG. 48 is a block diagram of the radial controlling system in one embodiment of the light beam position controlling apparatus in accordance with the present invention. In FIG. 48, the same components as those of FIG. 47 are represented by the same reference characters; reference B is a band-pass filter with the disk rotation frequency $\omega_r$ as an approximate center frequency, which lets pass only the disk rotation frequency component current $E_{R'}$ of the radial control driving current $E_R$. Memory M stores the signal $E_{R'}$. The transfer function of the band-pass filter B is $$B = \frac{2\zeta\omega_r S}{S^2 + 2\zeta\omega_r S + \omega_r^2}$$

wherein $\omega_r$ is disk rotation frequency; $\zeta$ is damping factor. One example of the board diagram of the transfer function is shown in FIG. 49. It is to be noted that the radial control, the access control, and the jump control are performed in a manner similar to the conventional one.

The radial controlling system of the present invention is different from the conventional controlling system. The component showing the eccentric condition of the information track in the component of the driving current is almost the disk rotation frequency component current $E_{R'}$. Only the disk rotation frequency component current $E_{R'}$ is stored in the memory M by the use of the common eccentric signals even in the different tracks. Even when the radial controlling operation is effected upon any track, the disk rotation frequency component current $E_{R'}$ memorized in the controlling signal is added in synchronous relation with the disk rotation to reduce the relative displacement between the light beam position and the disk information track, to stabilize the radial setting condition, and to reduce radial error, thus resulting in improved accuracy.

If a band-pass filter B, having a range wherein the damping factor $\zeta$ of 1 or smaller is used, the component of the radial control driving current $E_R$ passing through the band-pass filter B can be sufficiently restricted to the disk rotation frequency component.

Although a low-pass filter, instead of the band-pass filter B can be used, the phase of the output signal of the filter is lagged in the adoption of the low-pass filter, thus making it impossible to provide a more accurate eccentric signal.

To introduce the memory in the parallel control system of C, it is required to perform the memory control on the input $U_1$ of the radial actuator and/or the input $U_2$ of the linear motor. Especially it is more advantageous to have the memory control on the input $U_2$ which is corresponding to the linear motor driving current $E_R$. The description thereof will be given hereinafter.

Figure 50:
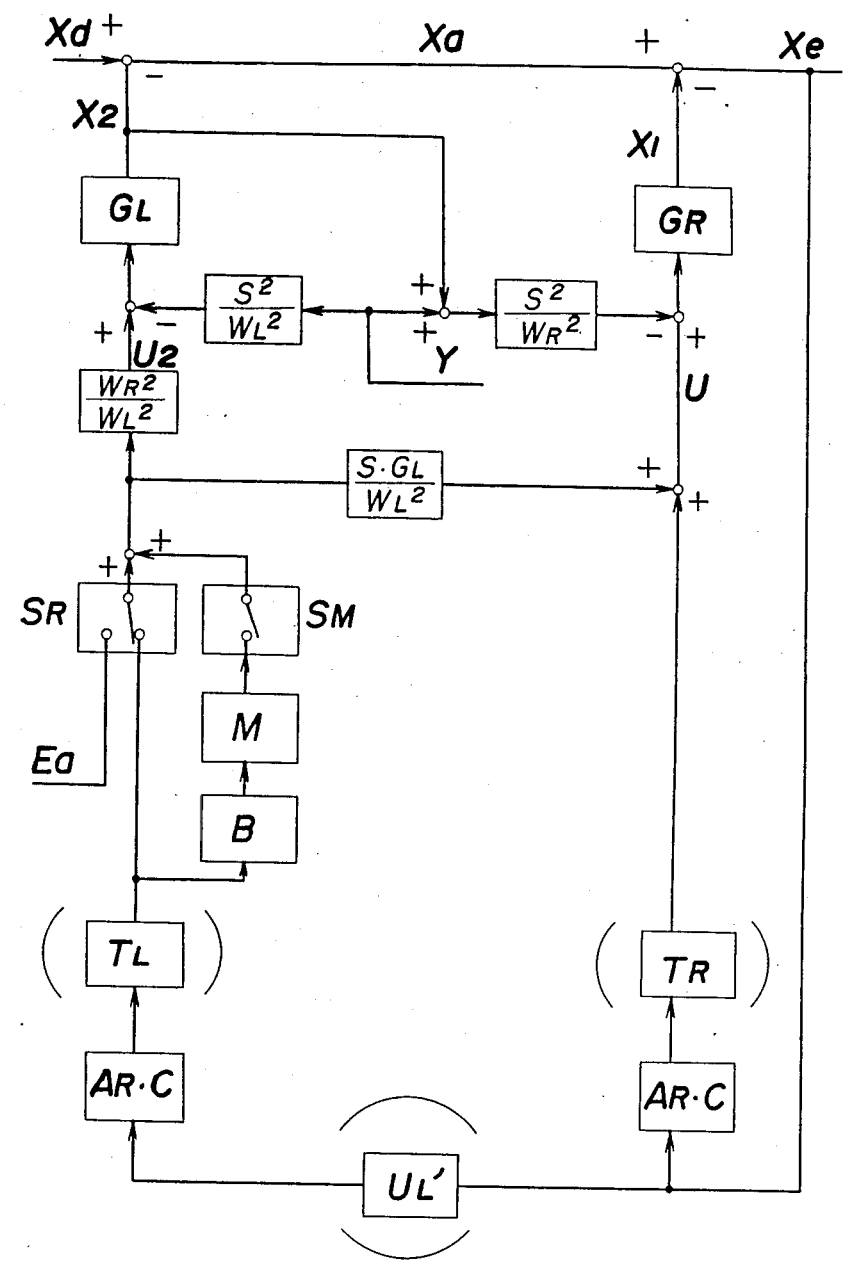
FIG. 50 is a block diagram of the parallel controlling system wherein the memory controlling operation has been performed.
Figure 51:
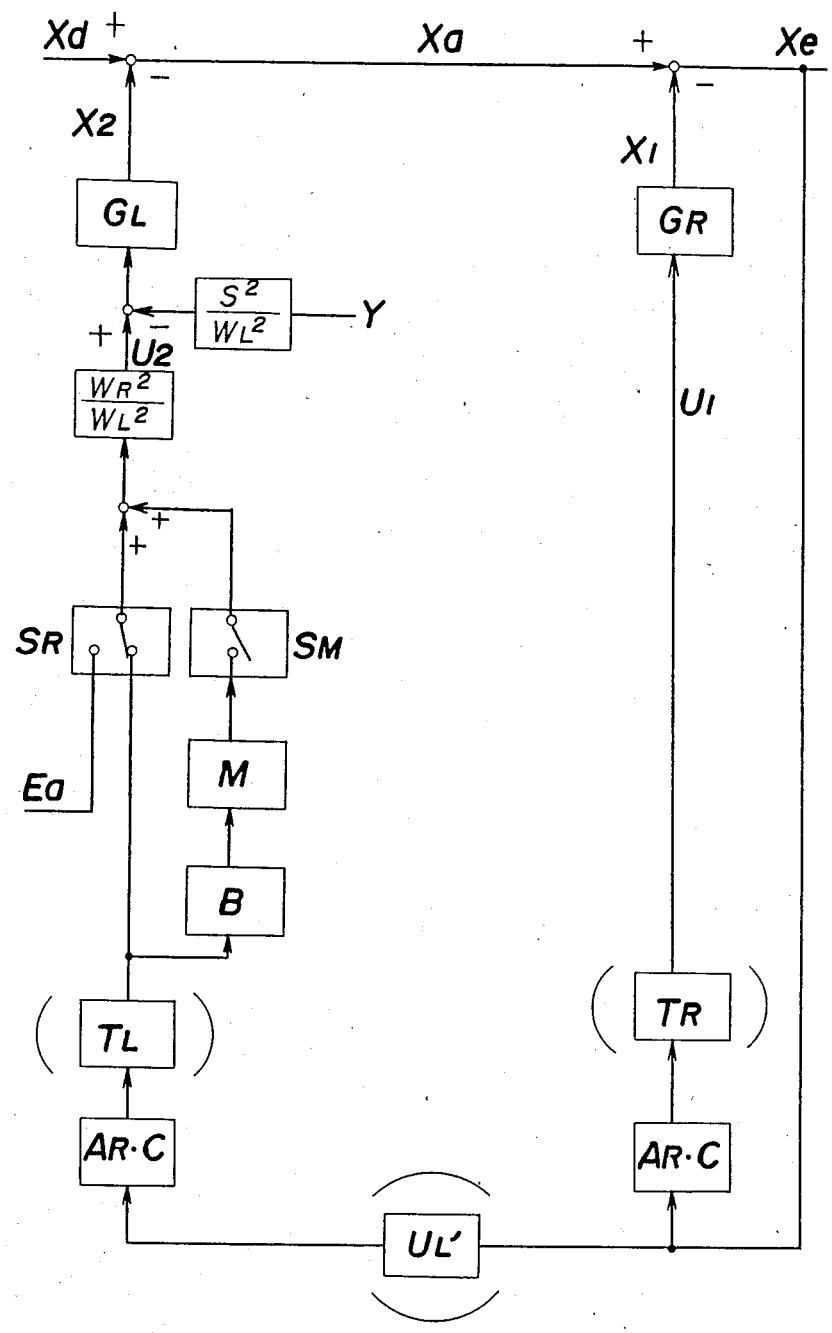
FIG. 51 is a block diagram of the parallel controlling system of the other type wherein the memory controlling operation has been effected.

FIG. 50 is a block diagram in the memory controlling operation in the parallel control system in which the radial actuator mechanism has been driven by two parallel springs. FIG. 51 is a block diagram in a case where the memory controlling operation has been effected in the parallel controlling system of the mirror-rotation driving operation of the radial actuator mechanism. $T_R$, $T_L$, $U_{L'}$ are put in parentheses, because the memory controlling operation is effective even in a case where the compensation of the $T_R$, $T_L$, $U_{L'}$ has been performed.

In the parallel controlling system described in C, the resonance frequency $\omega_L$ of the linear motor $G_L$ is generally lower than the resonance frequency $\omega_R$ of the radial actuator $G_R$. The linear transfer function Ga is adapted to apparently perform the phase lag compensation of the radial actuator $G_R$. Accordingly, the follow-up operation is effected by the linear-motor driving operation with respect to the large displacement in the low frequency component of the disk displacement Xd, and is effected by the radial actuator driving operation with respect to the small displacement in the high frequency component. Namely, as the follow-up operation is almost effected by the linear motor $G_L$ with respect to the components near the disk rotation frequency $\omega_r$ of the disk displacement Xd, it is more advantageous to perform the memory control on the linear motor driving current.

Also, it is advantageous to perform the memory control on the linear motor driving current to cause the entire optical head to be followed and driven with respect to the large displacement of the disk rotation. Because the movable range of the radial actuator is narrow when the disk displacement Xd is large, the more precise follow-up cannot be performed due to the optical offset caused when the follow-up displacement of the radial actuator, namely the component of the disk-rotation number $\omega_r$ is the largest in the frequency component when the disk displacement Xd is large.

Combine the controlling described in A with the controlling described in B, as illustrated, and more stability, improved stiffness are provided.

According to the present invention, light beam position controlling apparatus is provided wherein the compression factor is higher, the stability is better, the susceptibility to the disturbance oscillation is reduced, the stable parallel controlling operation is performed between the radial actuator and the linear motor, and the radial setting condition can be made stable.

Although the present invention has been fully described with reference to preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A light beam position controlling apparatus comprising:
    actuator means for performing a focus controlling operation or a radial controlling operation;
    a phase lag compensating circuit wherein a transfer function is $$U = \frac{s + \omega_2}{s + \omega_1}$$

wherein $w_1$, $w_2$ are two break point frequencies where $S = jw$ and $w_2$ is larger than $w_1$;
    a damping correction circuit wherein a transfer function is $$T = \frac{s^2 + 2\zeta_0 \omega_0 s + \omega_0^2}{s^2 + 2\zeta_1 \omega_0 s + \omega_0^2}$$

wherein $\zeta_1$ is a damping factor, $\zeta_0$ is a damping factor of said actuator means; and
    a driving circuit for driving said actuator upon receiving a driving current obtained with phase lag compensation and damping correction after an error signal is passed through said phase lag compensating circuit and damping correction circuit, the resonance frequency and damping factor of said actuator being respectively, $w_0$ and $\zeta_0$, $\zeta_0$ being smaller than 1.

2. The apparatus as defined in claim 1, wherein said phase lag compensating circuit is constructed in condition of $\omega_1 \cdot \omega_2 = \omega_0^2$, and said damping correction circuit is construed in condition of $$\zeta_1 = \frac{\omega_1 + \omega_2}{2\omega_0}.$$

3. The apparatus as defined in claim 2, wherein the resonance frequency of said damping correction circuit is set to be lower than the resonance frequency $\omega_0$ of said actuator.

4. The apparatus as defined in claim 1, wherein the resonance frequency of said damping correction circuit is set to be lower than the resonance frequency $\omega_0$ of said actuator.

5. A light beam position controlling apparatus comprising:
    a radial actuator adapted to drive an objective lens for causing the light beam to be accurately positioned in the radial direction of an optical disk;
    a band-pass filter providing a driving current of said radial actuator, wherein the rotation frequency $w_r$ of the optical disk is approximately a central frequency of said filter;
    memory means for storing said driving current in synchronous relation with the optical disk rotation, said stored current being fed into said radial actuator.

6. A light beam position controlling apparatus comprising:
    a linear motor for driving an optical head in the radial direction of an optical disk;
    a radial actuator built-in within said optical head and adapted to drive an objective lens, for causing the light beam to be accurately positioned in the radial direction in the optical disk and to rotate a mirror for causing the light beam to be deflected in the radial direction of the optical disk;
    a band-pass filter, wherein the driving current of said linear motor is flowed through said band-pass filter wherein the central frequency is approximately the rotation frequency $w_r$ of the optical disk; and
    memory means for storing said driving current in synchronous relation with the optical disk rotation, said stored current being fed into said linear motor.

7. A light beam position controlling apparatus comprising:
    a linear motor for driving an optical head in the radial direction of an optical disk;
    circuit means for setting the resonance frequency $w_L$ of said linear motor to at least the rotation frequency $w_r$ of the disk;
    means for controlling said linear motor including compensating circuit means for giving to said controlling means a phase lag compensation which raises the gain of a frequency band of said controlling means including the resonance frequency.

8. A light beam position controlling apparatus comprising:
- a linear motor for driving an optical head in the radial direction of an optical disk;
- a radial actuator built-in within said optical head and adapted to drive an objective lens, for causing the light beam to be accurately positioned in the radial direction of the optical disk and for rotating and driving a mirror, for causing the light beam to be deflected in the radial direction of the optical disk, wherein a resonance frequency $w_L$ of said linear motor is equal to at least the rotation frequency $w_r$ of the disk; and
- means for controlling said linear motor including compensating circuit means for giving to said controlling means a phase lag compensation which raises the gain of a frequency band of said controlling means including the resonance frequency.

9. A light beam position controlling apparatus, comprising:
- a linear motor for driving an optical head in the radial direction of an optical disk;
- a radial actuator built-in to said optical head and adapted to drive an objective lens for causing said light beam to be accurately positioned in the radial direction of said optical disk, and to rotate a mirror for causing said light beam to be deflected in the radial direction of said optical disk;
- a band-pass filter with a center frequency approximately equal to a resonance frequency of said linear motor for adding a control current of said linear motor to a control current of said radial actuator;
- wherein the ratio between the low-frequency gain of a feedback transfer function of said linear motor and the low-frequency gain of a feedback transfer function of said radial actuator is approximately equal to the square of the ratio between the resonance frequency of said radial actuator and the resonance frequency of said linear motor.

10. The light beam position controlling apparatus of claim 9, wherein the control current of said radial actuator first passes through a damping correction circuit having a transfer function corresponding to $$T_R = \frac{S^2 + 2\zeta_R W_R S + W_R^2}{S^2 + 2\zeta_R' W_R S + W_R^2}$$

wherein $S=jw$, $w_R$=the resonance frequency of said radial actuator, $\zeta_R$=the damping factor of said radial actuator, $\zeta_R' \geq 1$, and the control current of said linear motor first passes through a damping correction circuit having a transfer function corresponding to $$T_L = \frac{S^2 = 2\zeta_L W_L S + W_L^2}{S^2 + 2\zeta_L' W_L S + W_L^2}$$

wherein $\zeta_L$=the damping factor of said linear motor, $w_L$=the resonance frequency of said linear motor, and $\zeta_L' > 1$.

* * * * *